United States Patent
Matsuda

(10) Patent No.: US 7,517,089 B2
(45) Date of Patent: Apr. 14, 2009

(54) IMAGE PROCESSING SYSTEM, PROJECTOR, INFORMATION STORAGE MEDIUM, AND IMAGE PROCESSING METHOD

(75) Inventor: Hideki Matsuda, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 392 days.

(21) Appl. No.: 11/083,033

(22) Filed: Mar. 18, 2005

(65) Prior Publication Data
US 2005/0213821 A1   Sep. 29, 2005

(30) Foreign Application Priority Data
Mar. 29, 2004 (JP) .............................. 2004-095936
Mar. 29, 2004 (JP) .............................. 2004-095937

(51) Int. Cl.
*G03B 21/14* (2006.01)
(52) U.S. Cl. ..................... 353/69; 353/121; 345/694
(58) Field of Classification Search .................. 353/69, 353/70, 121, 122, 42; 348/745–747
See application file for complete search history.

(56) References Cited

U.S. PATENT DOCUMENTS

| 6,695,451 | B1 |  | 2/2004 | Yamasaki et al. |  |
|---|---|---|---|---|---|
| 6,846,081 | B2 | * | 1/2005 | Mochizuki et al. | 353/70 |
| 6,939,011 | B2 | * | 9/2005 | Kobayashi | 353/69 |
| 7,014,323 | B2 | * | 3/2006 | Kobayashi et al. | 353/69 |
| 7,125,122 | B2 | * | 10/2006 | Li et al. | 353/31 |
| 7,167,645 | B2 | * | 1/2007 | Matsuda et al. | 396/213 |
| 7,270,422 | B2 | * | 9/2007 | Matsuda et al. | 353/70 |
| 2002/0021418 | A1 | * | 2/2002 | Raskar | 353/69 |
| 2003/0210381 | A1 | * | 11/2003 | Itaki | 353/70 |
| 2005/0105057 | A1 | * | 5/2005 | Matsuda et al. | 353/70 |
| 2005/0162624 | A1 | * | 7/2005 | Miyasaka | 353/101 |
| 2005/0213846 | A1 |  | 9/2005 | Matsuda et al. | 353/70 |
| 2006/0152682 | A1 | * | 7/2006 | Matsuda et al. | 353/40 |
| 2006/0181687 | A1 | * | 8/2006 | Matsuda | 353/69 |

FOREIGN PATENT DOCUMENTS

| JP | 05-030520 | 2/1993 |
|---|---|---|
| JP | A 2000-149031 | 5/2000 |
| JP | A 2000-241874 | 9/2000 |
| JP | 2004-048694 | 2/2004 |
| JP | 2004-048695 | 2/2004 |
| JP | A 2004-260785 | 9/2004 |
| WO | WO 99/31877 A1 | 6/1999 |

* cited by examiner

*Primary Examiner*—William C Dowling
(74) *Attorney, Agent, or Firm*—Oliff & Berridge, PLC

(57) ABSTRACT

A projector is configured of a difference image generation section that generates a difference image between an all-white first calibration image and a second calibration image which includes an image having features at the center and periphery thereof, a center reference position detection section that detects a reference position of a center block area in the difference image, a peripheral reference position detection section that detects a reference position of a peripheral block area, and a projection area information generation section that generates projection area information indicating a position of a projection area, based on those reference positions.

11 Claims, 23 Drawing Sheets

PRIOR ART

IMAGE PROCESSING SYSTEM, PROJECTOR, INFORMATION STORAGE MEDIUM, AND IMAGE PROCESSING METHOD

Japanese Patent Application No. 2004-95936, filed on Mar. 29, 2004, and Japanese Patent Application No. 2004-95937, filed on Mar. 29, 2004 are hereby incorporated by reference in their entirety.

BACKGROUND OF THE INVENTION

The present invention relates to an image processing system, a projector, a program, an information storage medium, and an image processing method in which the detection of a projection area is based on sensing information.

A recent proposal for adjusting the position of a projection image involves using a projector that is provided with a CCD camera to project an image onto a projection target such as a screen, and using the CCD camera to sense the projected projection image and detect the coordinates of four corners of the projection-target area that correspond to the projection target within the sensing area.

For example, Japanese Patent Application Laid-Open No. 5-30520 proposes a configuration in which the position at which an image is projected is adjusted by displaying an image within an image-displayable area and sensing the entire image-displayable area.

However, when the configuration is based on the premise that the image is displayed within the image-displayable area, as in Japanese Patent Application Laid-Open No. 5-30520, it will not be possible to adjust the projection position of the image if part of the image is projected outside of the image-displayable area.

In particular, since projectors have become smaller in recent years, users are treating them as mobile projectors by carrying them around and setting them up in other locations to project images. In such a case, restrictions in installation locations could result in part of the projection image being displayed outside the screen. In such a situation, it is necessary to have a projector that can adjust the position of the projection image as appropriate.

In addition, although this Japanese Patent Application Laid-Open No. 5-30520 does disclose the process of detecting the positions of four corners of the displayable area of the screen by fetching luminance information stored in a frame memory into a CPU for image processing, it does not disclose any specific details of that image processing.

When the positions of the four corners of the screen are detected from sensing information during general-purpose image processing used in the art, it is necessary to subject the entire sensed image to filtering processing, which takes time for the image processing and also greatly increases the amount of calculations.

For that reason, calibration is time-consuming and thus the user has to wait for a longer time.

SUMMARY

According to a first aspect of the present invention, there is provided an image processing system comprising:

image projection means for projecting a first calibration image and a second calibration image at different timings;

sensing means for sensing the projected first and second calibration images and generating first and second sensing information; and projection area detection means for generating projection area information relating to a position of a projection area in a sensing area of the sensing means, based on the first and second sensing information, wherein a difference image between the first calibration image and the second calibration image is configured of a center block area positioned around the center of the difference image, a peripheral block area positioned on a periphery of the center block area, and a background area which is an area other than the center block area and the peripheral block area, wherein each pixel in the center block area and the peripheral block area has a different index value from each pixel in the background area, and wherein the projection area detection means comprises:

difference image generation means for generating the difference image, based on the first and second sensing information;

center reference position detection means for detecting a plurality of center reference positions of the center block area in the sensing area, based on the difference image;

peripheral reference position detection means for detecting a plurality of peripheral reference positions of the peripheral block area in the sensing area, based on the center reference positions; and projection area information generation means for generating the projection area information, based on the center reference positions and the peripheral reference positions.

According to a second aspect of the present invention, there is provided an image processing system comprising:

an image projection section which projects a first calibration image and a second calibration image at different timings;

a sensing section which senses the projected first and second calibration images and generates first and second sensing information; and a projection area detection section which generates projection area information relating to a position of a projection area in a sensing area of the sensing section, based on the first and second sensing information, wherein a difference image between the first calibration image and the second calibration image is configured of a center block area positioned around the center of the difference image, a peripheral block area positioned on a periphery of the center block area, and a background area which is an area other than the center block area and the peripheral block area, wherein each pixel in the center block area and the peripheral block area has a different index value from each pixel in the background area, and wherein the projection area detection section comprises:

a difference image generation section which generates the difference image, based on the first and second sensing information;

a center reference position detection section which detects a plurality of center reference positions of the center block area in the sensing area of the sensing section, based on the difference image;

a peripheral reference position detection section which detects a plurality of peripheral reference positions of the peripheral block area in the sensing area, based on the center reference positions; and a projection area information generation section which generates the projection area information, based on the center reference positions and the peripheral reference positions.

According to a third aspect of the present invention, there is provided a projector having any one of the above image processing systems.

According to a fourth aspect of the present invention, there is provided a program for causing a computer to function as:

image projection means for projecting a first calibration image and a second calibration image at different timings;

sensing means for sensing the projected first and second calibration images and generating first and second sensing information; and projection area detection means for generating projection area information relating to a position of a projection area in a sensing area of the sensing means, based on the first and second sensing information, wherein a difference image between the first calibration image and the second calibration image is configured of a center block area positioned around the center of the difference image, a peripheral block area positioned on a periphery of the center block area, and a background area which is an area other than the center block area and the peripheral block area, wherein each pixel in the center block area and the peripheral block area has a different index value from each pixel in the background area, and wherein the projection area detection means comprises:

difference image generation means for generating the difference image, based on the first and second sensing information;

center reference position detection means for detecting a plurality of center reference positions of the center block area in the sensing area, based on the difference image;

peripheral reference position detection means for detecting a plurality of peripheral reference positions of the peripheral block area in the sensing area, based on the center reference positions; and projection area information generation means for generating the projection area information, based on the center reference positions and the peripheral reference positions.

According to a fifth aspect of the present invention, there is provided an information storage medium which stores the above program.

According to a sixth aspect of the present invention, there is provided an image processing method for performing image processing based on a difference image which is a difference image between a first calibration image and a second calibration image, the difference image being configured of a center block area positioned around the center of the difference image, a peripheral block area positioned on a periphery of the center block area, and a background area which is an area other than the center block area and the peripheral block area, and each pixel in the center block area and the peripheral block area having a different index value from each pixel in the background area, the image processing method comprising:

projecting the first calibration image;

sensing the projected first calibration image by using a sensing section, to generate first sensing information;

projecting the second calibration image;

sensing the projected second calibration image by using the sensing section, to generate second sensing information;

generating the difference image, based on the first and second sensing information;

detecting a plurality of center reference positions of the center block area in a sensing area of the sensing section, based on the difference image;

detecting a plurality of peripheral reference positions of the peripheral block area in the sensing area, based on the center reference positions; and generating projection area information relating to a position of a projection area in the sensing area, based on the center reference positions and the peripheral reference positions.

According to a seventh aspect of the present invention, there is provided an image processing system comprising:

image projection means for projecting a first calibration image towards a projection target;

sensing means for sensing the projected first calibration image at a low resolution which is less than or equal to a predetermined resolution, to generate first sensing information, and also for sensing the first calibration image at a high resolution which is greater than or equal to the low resolution, to generate third sensing information; and projection-target area detection means for generating projection-target area information relating to a position of a projection-target area corresponding to the projection target in a sensing area of the sensing means, based on the first and third sensing information, wherein the projection-target area detection means comprises:

edge detection means for performing edge detection to generate first edge detection information, based on the first sensing information, and also performing edge detection to generate third edge detection information, based on the third sensing information; and projection-target area information generation means for generating provisional detection information by provisionally detecting the projection-target area based on the first edge detection information, and also generating the projection-target area information based on the third edge detection information, wherein the edge detection means generates the third edge detection information by performing edge detection on a pixel group around a boundary line of the provisionally detected projection-target area, based on the provisional detection information.

According to a eighth aspect of the present invention, there is provided an image processing system comprising:

an image projection section which projects a first calibration image towards a projection target;

a sensing section which senses the projected first calibration image at a low resolution which is less than or equal to a predetermined resolution, to generate first sensing information, and also senses the first calibration image at a high resolution which is greater than or equal to the low resolution, to generate third sensing information; and a projection-target area detection section which generates projection-target area information relating to a position of a projection-target area corresponding to the projection target in a sensing area of the sensing section, based on the first and third sensing information, wherein the projection-target area detection section comprises:

an edge detection section which performs edge detection to generate first edge detection information, based on the first sensing information, and also performs edge detection to generate third edge detection information, based on the third sensing information; and a projection-target area information generation section which generates provisional detection information by provisionally detecting the projection-target area based on the first edge detection information, and also generates the projection-target area information based on the third edge detection information, wherein the edge detection section generates the third edge detection information by performing edge detection on a pixel group around a boundary line of the provisionally detected projection-target area, based on the provisional detection information.

According to a ninth aspect of the present invention, there is provided a projector having any one of the above image processing systems.

According to a tenth aspect of the present invention, there is provided program for causing a computer to function as:

image projection means for projecting a first calibration image towards a projection target;

sensing means for sensing the projected first calibration image at a low resolution which is less than or equal to a predetermined resolution, to generate first sensing information, and also for sensing the first calibration image at a high resolution which is greater than or equal to the low resolution, to generate third sensing information; and projection-target area detection means for generating projection-target area information relating to a position of a projection-target area corresponding to the projection target in a sensing area of the sensing means, based on the first and third sensing information, wherein the projection-target area detection means comprises:

edge detection means for performing edge detection to generate first edge detection information, based on the first sensing information, and also performing edge detection to generate third edge detection information, based on the third sensing information; and projection-target area information generation means for generating provisional detection information by provisionally detecting the projection-target area based on the first edge detection information, and also generating the projection-target area information based on the third edge detection information, wherein the edge detection means generates the third edge detection information by performing edge detection on a pixel group around a boundary line of the provisionally detected projection-target area, based on the provisional detection information.

According to a eleventh aspect of the present invention, there is provided an information storage medium which stores the above program.

According to a twelfth aspect of the present invention, there is provided an image processing method comprising:

projecting a first calibration image towards a projection target;

sensing the projected first calibration image at a low resolution which is less than or equal to a predetermined resolution by using a sensing section, to generate first sensing information;

sensing the first calibration image at a high resolution which is greater than or equal to the low resolution by using the sensing section, to generate third sensing information;

performing edge detection to generate first edge detection information, based on the first sensing information;

generating provisional detection information by provisionally detecting a projection-target area corresponding to the projection target in a sensing area of the sensing section, based on the first edge detection information;

generating third edge detection information by performing edge detection on a pixel group around a boundary line of the provisionally detected projection-target area, based on the provisional detection information; and detecting the projection-target area to generate projection-target area information relating to a position of the projection-target area, based on the third edge detection information.

DETAILED DESCRIPTION OF THE EMBODIMENT

Figure 1:
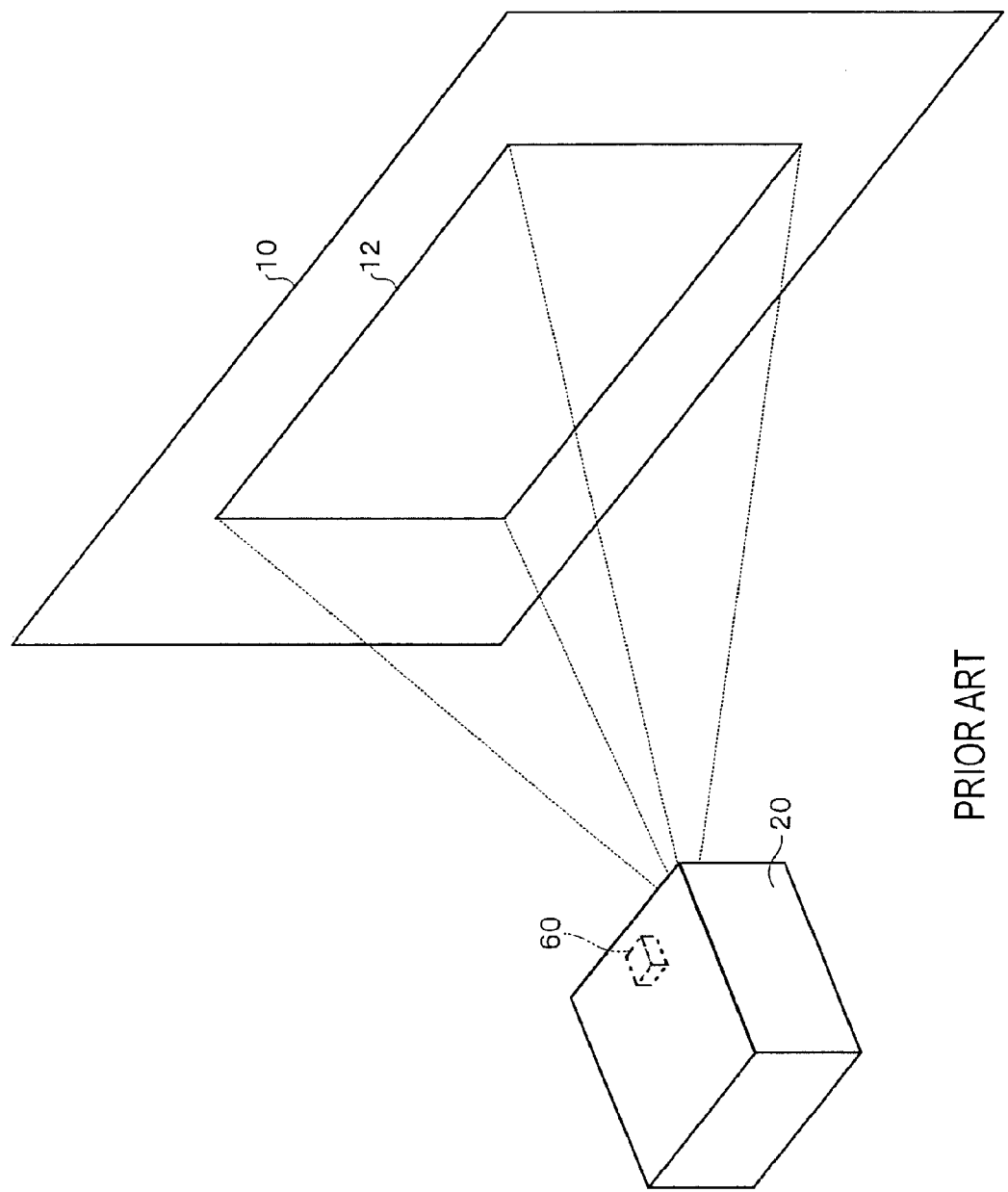
FIG. 1 is a schematic view of an image projection state of a first embodiment of the present invention.

Embodiments of the present invention were devised in the light of the above-described technical problems. The embodiments may provide an image processing system, a projector, a program, an information storage medium, and an image processing method that enable the appropriate generation of positional information for a projection area, even when part of a projection image is displayed outside of a projection target.

Furthermore, embodiments of the present invention may also provide an image processing system, a projector, a program, an information storage medium, and an image processing method that enable the generation of positional information for the projection-target area in a shorter time and also accurately.

According to one embodiment of the present invention, there are provided an image processing system and a projector, each of which comprising:

image projection means for projecting a first calibration image and a second calibration image at different timings;

sensing means for sensing the projected first and second calibration images and generating first and second sensing information; and projection area detection means for generating projection area information relating to a position of a projection area in a sensing area of the sensing means, based on the first and second sensing information, wherein a difference image between the first calibration image and the second calibration image is configured of a center block area positioned around the center of the difference image, a peripheral block area positioned on a periphery of the center block area, and a background area which is an area other than the center block area and the peripheral block area, wherein each pixel in the center block area and the peripheral block area has a different index value from each pixel in the background area, and wherein the projection area detection means comprises:

difference image generation means for generating the difference image, based on the first and second sensing information;

center reference position detection means for detecting a plurality of center reference positions of the center block area in the sensing area, based on the difference image;

peripheral reference position detection means for detecting a plurality of peripheral reference positions of the peripheral block area in the sensing area, based on the center reference positions; and projection area information generation means for generating the projection area information, based on the center reference positions and the peripheral reference positions.

According to one embodiment of the present invention, there is provided a program for causing a computer to function as:

image projection means for projecting a first calibration image and a second calibration image at different timings;

sensing means for sensing the projected first and second calibration images and generating first and second sensing information; and projection area detection means for generating projection area information relating to a position of a projection area in a sensing area of the sensing means, based on the first and second sensing information, wherein a difference image between the first calibration image and the second calibration image is configured of a center block area positioned around the center of the difference image, a peripheral block area positioned on a periphery of the center block area, and a background area which is an area other than the center block area and the peripheral block area, wherein each pixel in the center block area and the peripheral block area has a different index value from each pixel in the background area, and wherein the projection area detection means comprises:

difference image generation means for generating the difference image, based on the first and second sensing information;

center reference position detection means for detecting a plurality of center reference positions of the center block area in the sensing area, based on the difference image;

peripheral reference position detection means for detecting a plurality of peripheral reference positions of the peripheral block area in the sensing area, based on the center reference positions; and projection area information generation means for generating the projection area information, based on the center reference positions and the peripheral reference positions.

According to one embodiment of the present invention, there is provided an information storage medium which stores the above program.

According to one embodiment of the present invention, there is provided an image processing method for performing image processing based on a difference image which is a difference image between a first calibration image and a second calibration image, the difference image being configured of a center block area positioned around the center of the difference image, a peripheral block area positioned on a periphery of the center block area, and a background area which is an area other than the center block area and the peripheral block area, and each pixel in the center block area and the peripheral block area having a different index value from each pixel in the background area, the image processing method comprising:

projecting the first calibration image;

sensing the projected first calibration image by using a sensing section, to generate first sensing information;

projecting the second calibration image;

sensing the projected second calibration image by using the sensing section, to generate second sensing information;

generating the difference image, based on the first and second sensing information;

detecting a plurality of center reference positions of the center block area in a sensing area of the sensing section, based on the difference image;

detecting a plurality of peripheral reference positions of the peripheral block area in the sensing area, based on the center reference positions; and generating projection area information relating to a position of a projection area in the sensing area, based on the center reference positions and the peripheral reference positions.

With this embodiment, the image processing system and the like generate positional information for the projection area by detecting a center reference position of a center block area that is smaller than the projection area corresponding to the projection image, even if part of the projection image is projected outside of the projection target.

In particular, since this embodiment enables the image processing system and the like to determine the position of the projection area based not only on a center reference position but also on a peripheral reference position of a peripheral block area that is positioned on the periphery thereof, the positional information of the projection area can be generated more precisely.

Note that this image processing system or the like could use images such that a monochrome image is used as the first calibration image; an image consisting of a center block area positioned in the vicinity of the center thereof, a peripheral block area positioned on the periphery of that center block area, and a background area that is an area other than the center block area and the peripheral block area is used as the second calibration image; where each pixel in the center block area and the peripheral block area has a different index value from each pixel in the background area.

In the image processing system, the projector, the program, and the information storage medium, the projection area information generation means may generate the projection area information by setting a plurality of approximated straight lines or approximated curves based on the center reference positions and the peripheral reference positions and determining the shape or arrangement of the center block area and the peripheral block area.

The image processing method may comprise:

generating the projection area information by setting a plurality of approximated straight lines or approximated curves based on the center reference positions and the peripheral reference positions and determining the shape or arrangement of the center block area and the peripheral block area.

In the image processing system, the projector, the program, and the information storage medium, the projection area and the center block area may be rectangular areas, and the projection area information generation means may determine positions of four corners of the center block area by deriving intersections of the plurality of approximated straight lines or intersections of the plurality of approximated curves, and may generate the projection area information indicating positions of four corners of the projection area, based on the positions of the four corners of the center block area.

In the image processing method, the projection area and the center block area may be rectangular areas, the image processing method may comprise:

determining positions of four corners of the center block area by deriving intersections of the plurality of approximated straight lines or intersections of the plurality of approximated curves, and generating the projection area information indicating positions of four corners of the projection area, based on the positions of the four corners of the center block area.

Since this makes it possible for the image processing system and the like to determine the positions of the four corners of the projection area based on the four corners of the center block area, the positions of the four corners of the projection area can be determined with less processing.

The image processing system, the projector, the program, and the information storage medium may further comprise:

projection-target area boundary point detection means for detecting a plurality of boundary points of projection-target area corresponding to a projection target in the sensing area, based on the first sensing information and the center reference positions;

wherein the peripheral reference position detection means may detect the peripheral reference positions, based on the boundary points.

The image processing method may comprise:

detecting a plurality of boundary points of projection-target area corresponding to a projection target in the sensing area, based on the first sensing information and the center reference positions; and detecting the peripheral reference positions based on the boundary points.

Note that in this case, the peripheral reference position detection means and the image processing method could detect a peripheral reference position that is positioned closer to the boundary point than the center reference position.

Since this makes it possible for the image processing system and the like to base the generation of positional information for the projection area on a plurality of reference position that are separated, there is less room for error and the positional information of the projection area can be generated more precisely.

According to one embodiment of the present invention, there are provided an image processing system and an projector, each of which comprising:

image projection means for projecting a first calibration image towards a projection target;

sensing means for sensing the projected first calibration image at a low resolution which is less than or equal to a predetermined resolution, to generate first sensing information, and also for sensing the first calibration image at a high resolution which is greater than or equal to the low resolution, to generate third sensing information; and projection-target area detection means for generating projection-target area information relating to a position of a projection-target area corresponding to the projection target in a sensing area of the sensing means, based on the first and third sensing information, wherein the projection-target area detection means comprises:

edge detection means for performing edge detection to generate first edge detection information, based on the first sensing information, and also performing edge detection to generate third edge detection information, based on the third sensing information; and projection-target area information generation means for generating provisional detection information by provisionally detecting the projection-target area based on the first edge detection information, and also generating the projection-target area information based on the third edge detection information, wherein the edge detection means generates the third edge detection information by performing edge detection on a pixel group around a boundary line of the provisionally detected projection-target area, based on the provisional detection information.

According to one embodiment of the present invention, there is provided a program for causing a computer to function as:

image projection means for projecting a first calibration image towards a projection target;

sensing means for sensing the projected first calibration image at a low resolution which is less than or equal to a predetermined resolution, to generate first sensing information, and also for sensing the first calibration image at a high resolution which is greater than or equal to the low resolution, to generate third sensing information; and projection-target area detection means for generating projection-target area information relating to a position of a projection-target area corresponding to the projection target in a sensing area of the sensing means, based on the first and third sensing information, wherein the projection-target area detection means comprises:

edge detection means for performing edge detection to generate first edge detection information, based on the first sensing information, and also performing edge detection to generate third edge detection information, based on the third sensing information; and projection-target area information generation means for generating provisional detection information by provisionally detecting the projection-target area based on the first edge detection information, and also generating the projection-target area information based on the third edge detection information, wherein the edge detection means generates the third edge detection information by performing edge detection on a pixel group around a boundary line of the provisionally detected projection-target area, based on the provisional detection information.

According to one embodiment of the present invention, there is provided an information storage medium which stores the above program.

According to one embodiment of the present invention, there is provided an image processing method comprising:

projecting a first calibration image towards a projection target;

sensing the projected first calibration image at a low resolution which is less than or equal to a predetermined resolution by using a sensing section, to generate first sensing information;

sensing the first calibration image at a high resolution which is greater than or equal to the low resolution by using the sensing section, to generate third sensing information;

performing edge detection to generate first edge detection information, based on the first sensing information;

generating provisional detection information by provisionally detecting a projection-target area corresponding to the projection target in a sensing area of the sensing section, based on the first edge detection information;

generating third edge detection information by performing edge detection on a pixel group around a boundary line of the provisionally detected projection-target area, based on the provisional detection information; and detecting the projection-target area to generate projection-target area information relating to a position of the projection-target area, based on the third edge detection information.

With this embodiment, the image processing system and the like can generate positional information for the projection-target area in a shorter time and also more accurately, by provisionally detecting the projection-target area based on low-resolution sensing information then detecting the projection-target area based on high-resolution sensing information in the vicinity of a boundary line thereof.

In the image processing system, the projector, the program, and the information storage medium, the edge detection means may detect edges at a plurality of locations within a first sensed image based on the first sensing information, to generate the first edge detection information, and the projection-target area information generation means may generate the provisional detection information by setting a linear approximated straight line or linear approximated curve, based on positional information of the plurality of locations which is based on the first edge detection information.

The image processing method may comprise:

detecting edges at a plurality of locations within a first sensed image based on the first sensing information, to generate the first edge detection information; and generating the provisional detection information by setting a linear approximated straight line or linear approximated curve, based on positional information of the plurality of locations which is based on the first edge detection information.

This makes it possible for the image processing system and the like to generate positional information for the projection-target area in a shorter time, by performing edge detection in a state in which the region subjected to the edge detection processing has been reduced.

In the image processing system, the projector, the program, and the information storage medium, the projection-target area detection means may comprise detection point evaluation means for evaluating a plurality of edge detection points, and the detection point evaluation means may determine whether or not each of the plurality of edge detection points is distanced from the linear approximated straight line or the linear approximated curve by at least a predetermined value, and may control the projection-target area information generation means in such a manner that a detection point which is distanced by at least the predetermined value is excluded and the linear approximated straight line or the linear approximated curve is reset.

The image processing method may comprise:

determining whether or not each of a plurality of edge detection points is distanced from the linear approximated straight line or the linear approximated curve by at least a predetermined value; and resetting the linear approximated straight line or the linear approximated curve in such a manner that a detection point which is distanced by at least the predetermined value is excluded.

This makes it possible for the image processing system and the like to reduce the effects of noise and generate positional information for the projection-target area in a shorter time, by implementing processing that excludes detection points that are separated from linear approximated straight lines or the like.

The image processing system and the projector may further comprise:

difference image generation means for generating a difference image; and center reference position detection means for detecting a plurality of center reference positions of a predetermined center block area in the sensing area, based on the difference image, wherein the projection-target area detection means may comprise search area determination means for setting an edge detection area by the edge detection means, wherein the image projection means may project a second calibration image, wherein the sensing means may sense the projected second calibration image and may generate second sensing information, wherein the difference image generation means may generate the difference image, based on the first and second sensing information, wherein the search area determination means may set the edge detection area outside the center block area, wherein the first calibration image may be a monochrome calibration image, and wherein the second calibration image may comprise the center block area which is smaller than the second calibration image and which is positioned around the center of the second calibration image.

The program and the information storage medium may cause a computer to function as:

difference image generation means for generating a difference image; and center reference position detection means for detecting a plurality of center reference positions of a predetermined center block area in the sensing area, based on the difference image, wherein the projection-target area detection means may comprise search area determination means for setting an edge detection area by the edge detection means, wherein the image projection means may project a second calibration image, wherein the sensing means may sense the projected second calibration image and may generate second sensing information, wherein the difference image generation means may generate the difference image, based on the first and second sensing information, wherein the search area determination means may set the edge detection area outside the center block area, wherein the first calibration image may be a monochrome calibration image, and wherein the second calibration image may comprise the center block area which is smaller than the second calibration image and which is positioned around the center of the second calibration image.

The image processing method may further comprise:

projecting a second calibration image;

sensing the projected second calibration image by using the sensing section, to generate second sensing information;

generating a difference image, based on the first and second sensing information;

detecting a plurality of center reference positions of a predetermined center block area in the sensing area, based on the difference image; and setting an edge detection area outside the center block area, wherein the first calibration image may be a monochrome calibration image, and wherein the second calibration image may comprise the center block area which is smaller than the second calibration image and which is positioned around the center of the second calibration image.

This makes it possible for the image processing system and the like to generate positional information for the projection-target area in a shorter time, by implementing processing that reduces the region that is subjected to edge detection.

In the image processing system and the projector, the second calibration image may be configured of the center block area, a peripheral block area positioned on a periphery of the center block area, and a background area that is an area other than the center block area and the peripheral block area, each pixel in the center block area and the peripheral block area may have a different index value from each pixel in the background area, and the image processing system and the projector may comprise:

peripheral reference position detection means for detecting a plurality of peripheral reference positions of the peripheral block area in the sensing area, based on the center reference positions; and projection area information generation means for generating projection area information relating to a position of a projection area in the sensing area, based on the center reference positions and the peripheral reference positions.

In the program and the information storage medium, the second calibration image may be configured of the center block area, a peripheral block area positioned on a periphery of the center block area, and a background area that is an area other than the center block area and the peripheral block area, each pixel in the center block area and the peripheral block area may have a different index value from each pixel in the background area, and the program and the information storage medium may cause a computer to function as:

peripheral reference position detection means for detecting a plurality of peripheral reference positions of the peripheral block area in the sensing area, based on the center reference positions; and projection area information generation means for generating projection area information relating to a position of a projection area in the sensing area, based on the center reference positions and the peripheral reference positions.

In the image processing method, the second calibration image may be configured of the center block area, a peripheral block area positioned on a periphery of the center block area, and a background area that is an area other than the center block area and the peripheral block area, each pixel in the center block area and the peripheral block area may have a different index value from each pixel in the background area, and the image processing method may further comprise:

detecting a plurality of peripheral reference positions of the peripheral block area in the sensing area, based on the center reference positions; and generating projection area information relating to a position of a projection area in the sensing area, based on the center reference positions and the peripheral reference positions.

With this embodiment, the image processing system and the like generate positional information for the projection area by detecting a center reference position of a center block area that is smaller than the projection area corresponding to the projection image, even if part of the projection image is projected outside of the projection target.

In particular, since this embodiment enables the image processing system and the like to determine the position of the projection area based not only on a center reference position but also on a peripheral reference position of a peripheral block area that is positioned on the periphery thereof, the positional information of the projection area can be generated more precisely.

In the image processing system, the projector, the program, and the information storage medium, the projection area information generation means may generate the projection area information by setting a plurality of approximated straight lines or approximated curves based on the center reference positions and the peripheral reference positions and determining the shape or arrangement of the center block area and the peripheral block area.

The image processing method may comprise:

generating the projection area information by setting a plurality of approximated straight lines or approximated curves based on the center reference positions and the peripheral reference positions and determining the shape or arrangement of the center block area and the peripheral block area.

In the image processing system, the projector, the program, and the information storage medium, the projection area and the center block area may be rectangular areas, and the projection area information generation means may determine positions of four corners of the center block area by deriving intersections of the plurality of approximated straight lines or intersections of the plurality of approximated curves, and may generate the projection area information indicating positions of four corners of the projection area, based on the positions of the four corners of the center block area.

In the image processing method, the projection area and the center block area may be rectangular areas, and the image processing method may comprise:

determining positions of four corners of the center block area by deriving intersections of the plurality of approximated straight lines or intersections of the plurality of approximated curves, and generating the projection area information indicating positions of four corners of the projection area, based on the positions of the four corners of the center block area.

Since this makes it possible for the image processing system and the like to determine the positions of the four corners of the projection area based on the four corners of the center block area, the positions of the four corners of the projection area can be determined with less processing.

The image processing system and the projector may further comprise:

projection-target area boundary point detection means for detecting a plurality of boundary points of the projection-target area, based on the first sensing information and the center reference positions, wherein the peripheral reference position detection means may detect the peripheral reference positions which are positioned closer to the boundary points than the center reference positions, based on the boundary points.

The program and the information storage medium may cause a computer to functions as:

projection-target area boundary point detection means for detecting a plurality of boundary points of the projection-target area, based on the first sensing information and the center reference positions, wherein the peripheral reference position detection means may detect the peripheral reference positions, based on the boundary points.

The image processing method may comprise:

detecting a plurality of boundary points of the projection-target area, based on the first sensing information and the center reference positions; and detecting the peripheral reference positions, based on the boundary points.

Note that in this case, the peripheral reference position detection means and the image processing method could detect a peripheral reference position that is positioned closer to the boundary point than the center reference position.

Since this makes it possible for the image processing system and the like to base the generation of positional information for the projection area on a plurality of reference position that are separated, there is less room for error and the positional information of the projection area can be generated more precisely.

The image processing system and the projector may further comprise:

image distortion correction means for determining whether there is distortion in an image projected by the image projection means, based on the projection-target area information and the projection area information, and correcting an image signal to correct the distortion, wherein the image projection means may project an image based on the image signal which has been corrected by the image distortion correction means.

The program and the information storage medium may cause a computer to function as:

image distortion correction means for determining whether there is distortion in an image projected by the image projection means, based on the projection-target area information and the projection area information, and correcting an image signal to correct the distortion, wherein the image projection means may project an image based on the image signal which has been corrected by the image distortion correction means.

The image processing method may comprise:

determining whether there is distortion in an image to be projected, based on the projection-target area information and the projection area information, and correcting an image signal to correct the distortion.

Since this makes it possible for the image processing system and the like to generate positional information for each of the projection-target area and the projection area with less processing than in the art, image distortion can be corrected more efficiently than in the art.

The present invention is described below as being applied to a projector having an image processing system, with reference to the accompanying figures. Note that the embodiments described below do not limit the scope of the invention defined by the claims laid out herein. In addition, not all of the elements of the embodiments described below should be taken as essential requirements of the present invention.

First Embodiment

A schematic view of an image projection state of a first embodiment of the present invention is shown in FIG. 1. A conceptual view of the positional relationship of a screen 10 and a projection image 12 in accordance with the first embodiment is shown in FIG. 2.

A projector 20 projects an image towards the screen 10. This causes the display of the projection image 12 on the screen 10.

The projector 20 of the first embodiment has a sensor 60 that is a sensing means. The sensor 60 senses the screen 10 on which the projection image 12 is displayed, through a sensing screen, and generates sensing information. The projector 20 adjusts the distortion and the display position of the projection image 12, based on the sensing information.

Figure 2:
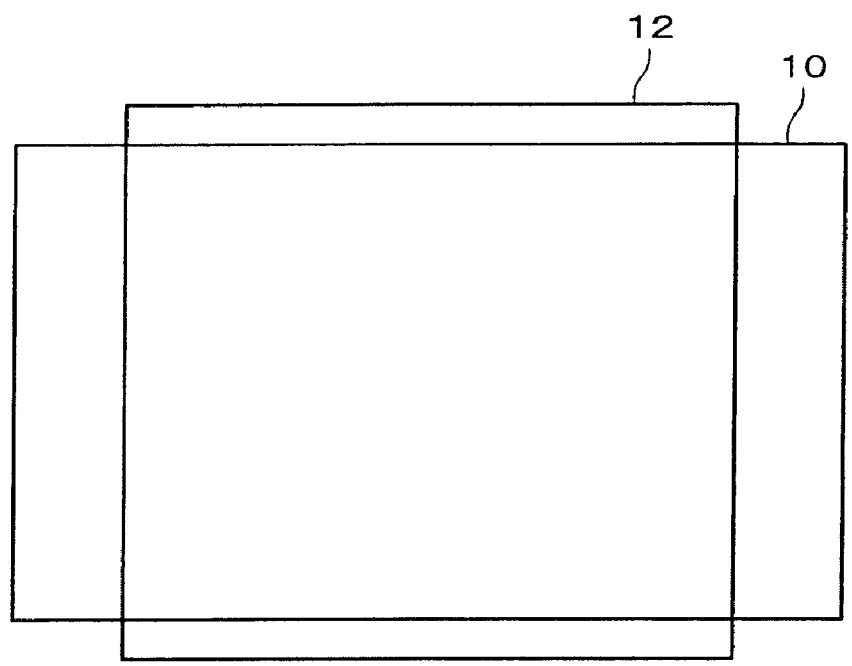
FIG. 2 is a conceptual view of the positional relationship of a screen and a projection image in accordance with the first embodiment.

However, if part of the projection image 12 is displayed outside of the screen 10, as shown by way of example in FIG. 2, a prior-art projector would be unable to adjust the distortion of the projection image 12 and the display position thereof, based on sensing information.

This is because the screen 10 and the wall that is behind the screen 10 are separated by some distance and the prior-art projector is unable to convert the position of the peak point of the projection image 12, which is either displayed on the wall or background objects at unknown distances or is not displayed at all, into a position on the plane of the screen 10, even though the projection image 12 is within the sensing area of the sensor 60.

The projector 20 of the first embodiment uses a calibration image that differs from that of the prior art in that it enables the determination of the position of the projection image 12 more precisely under a wider range of conditions than in the prior art, by implementing simple search processing based on sensing information of that calibration image.

The description now turns to function blocks of the projector 20 for implementing the above functions.

Figure 3:
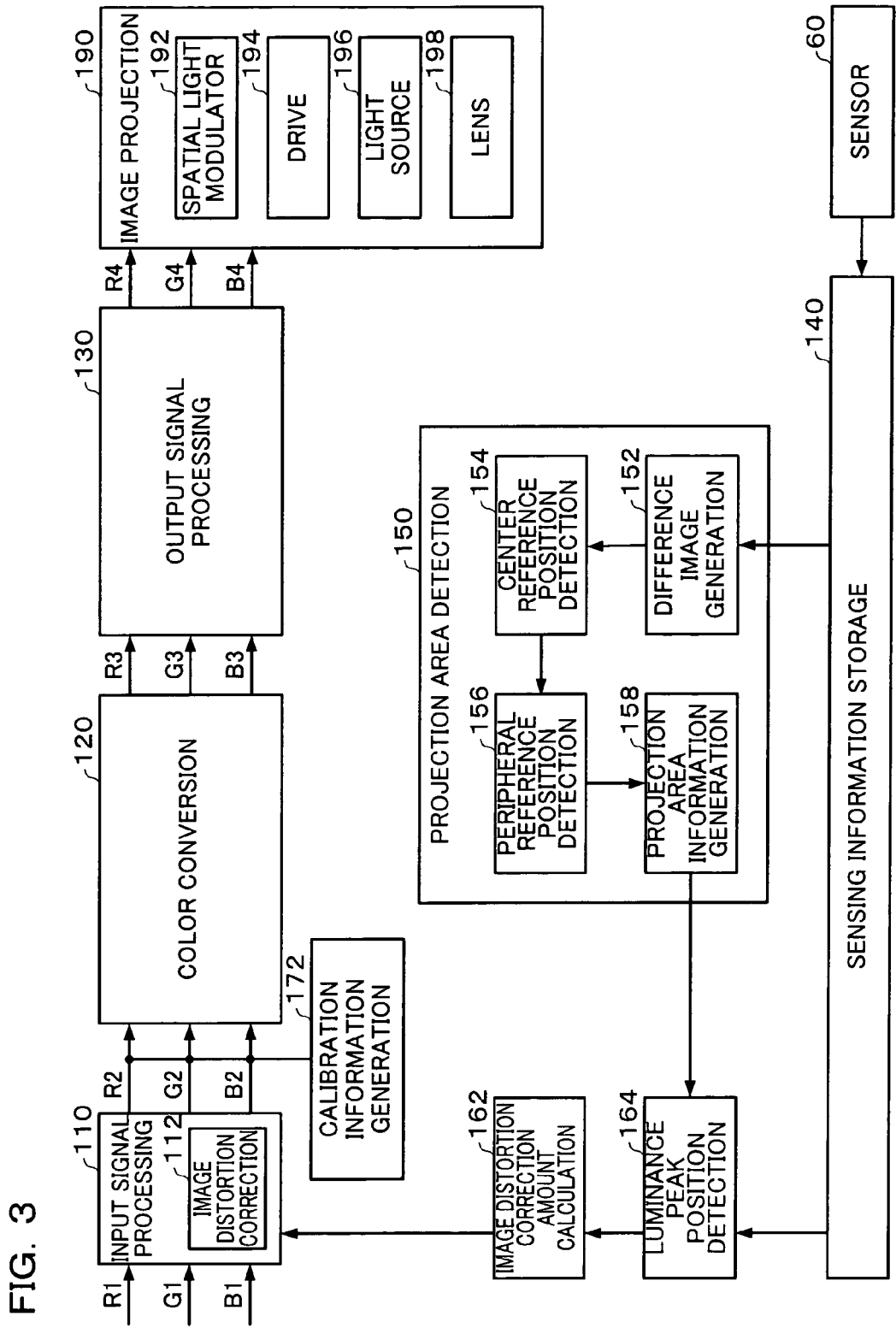
FIG. 3 is a functional block diagram of a projector in accordance with the first embodiment.

A functional block diagram of the projector 20 in accordance with the first embodiment is shown in FIG. 3.

The projector 20 comprises an input signal processing section 110 that converts analog RGB signals (R1, G1, and B1) into digital RGB signals (R2, G2, and B2); a color conversion section 120 that converts those digital RGB signals (R2, G2, and B2) into digital RGB signals (R3, G3, and B3), in order to correct the color and brightness of the image; an output signal processing section 130 that converts those digital RGB signals (R3, G3, and B3) into analog RGB signals (R4, G4, and B4); and an image projection section 190 that projects an image based on those analog RGB signals.

The image projection section 190 comprises a spatial light modulator 192, a drive section 194 for driving the spatial light modulator 192, a light source 196, and a 15 lens 198. The drive section 194 drives the spatial light modulator 192, based on image signals from the output signal processing section 130. The image projection section 190 projects light from the light source 196 through the spatial light modulator 192 and the lens 198.

The projector 20 also comprises a calibration information generation section 172 that generates calibration information for displaying first and second calibration images; the sensor 60 that generates sensing information for the calibration images; and a sensing information storage section 140 that temporarily stores sensing information from the sensor 60.

The projector 20 further comprises a projection area detection section 150 that detects the position of the projection area in the sensing screen (sensing area) of the sensor 60, based on the sensing information. The projection area detection section 150 comprises a difference image generation section 152 that generates a difference image between a first sensed image and a second sensed image, a center reference position detection section 154 that detects a plurality of center reference positions of a center block area comprised within the difference image, a peripheral reference position detection section 156 that detects a plurality of peripheral reference positions of peripheral block areas comprised within the difference image, and a projection area information generation section 158 that generates projection area information indicating the position of the projection area, based on the reference positions.

The projector 20 also has a function that corrects distortion of the projection image 12. To implement this function, the projector 20 comprises a luminance peak position detection section 164 that detects a luminance peak position (the position of the pixel at which the luminance value is a maximum) within the projection area, based on the projection area information; an image distortion correction amount calculation section 162 that calculates the amount of image distortion correction, based on the luminance peak position; and an image distortion correction section 112 that corrects the image signal, based on the image distortion correction amount.

The hardware described below can be applied for implementing the functions of the above-described components of the projector 20.

Figure 4:
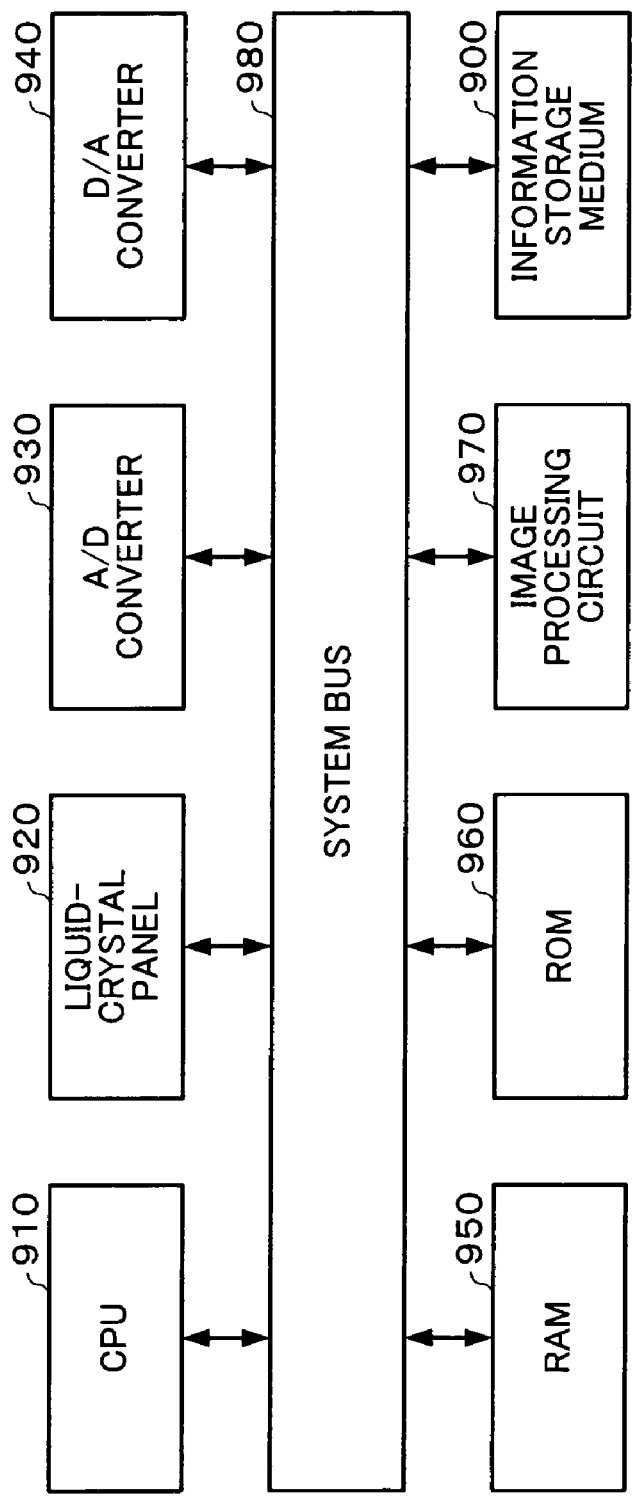
FIG. 4 is a block diagram of hardware for the projector in accordance with the first embodiment.

A block diagram of hardware for the projector 20 of the first embodiment is shown in FIG. 4.

For example, the configuration could be implemented by using an A/D converter 930 and image processing circuit 970, or the like, as the input signal processing section 110; RAM 950 or the like as the sensing information storage section 140; the image processing circuit 970 or the like as the projection area detection section 150 and the luminance peak position detection section 164; a CPU 910 or the like as the image distortion correction amount calculation section 162; the image processing circuit 970 and the RAM 950, or the like, as the calibration information generation section 172; a D/A converter 940 or the like as the output signal processing section 130; a liquid-crystal panel 920 or the like as the spatial light modulator 192; and a ROM 960 or the like which stores a liquid-crystal light valve driver for driving the liquid-crystal panel 920, as the drive section 194.

Note that these components can exchange information between themselves over a system bus 980.

These components could also be implemented in a hardware fashion by circuitry, or in a software manner by drivers or the like.

In addition, an information storage medium 900 which stores a program that causes a computer to function as components such as the difference image generation section 152 could be installed in the computer, and the computer reads out the program in order to function as the difference image generation section 152, etc.

This information storage medium 900 could be a CD-ROM, DVD-ROM, ROM, RAM, or HDD, by way of example, and the method of reading the program therefrom could be a direct method or an indirect method.

Instead of the information storage medium 900, it is also possible to download a program that implements the above-described functions, from a host device through a transfer path, in order to implement the above-described functions.

The description now turns to the flow of projection area position detection processing that is performed by using these components.

Figure 5:
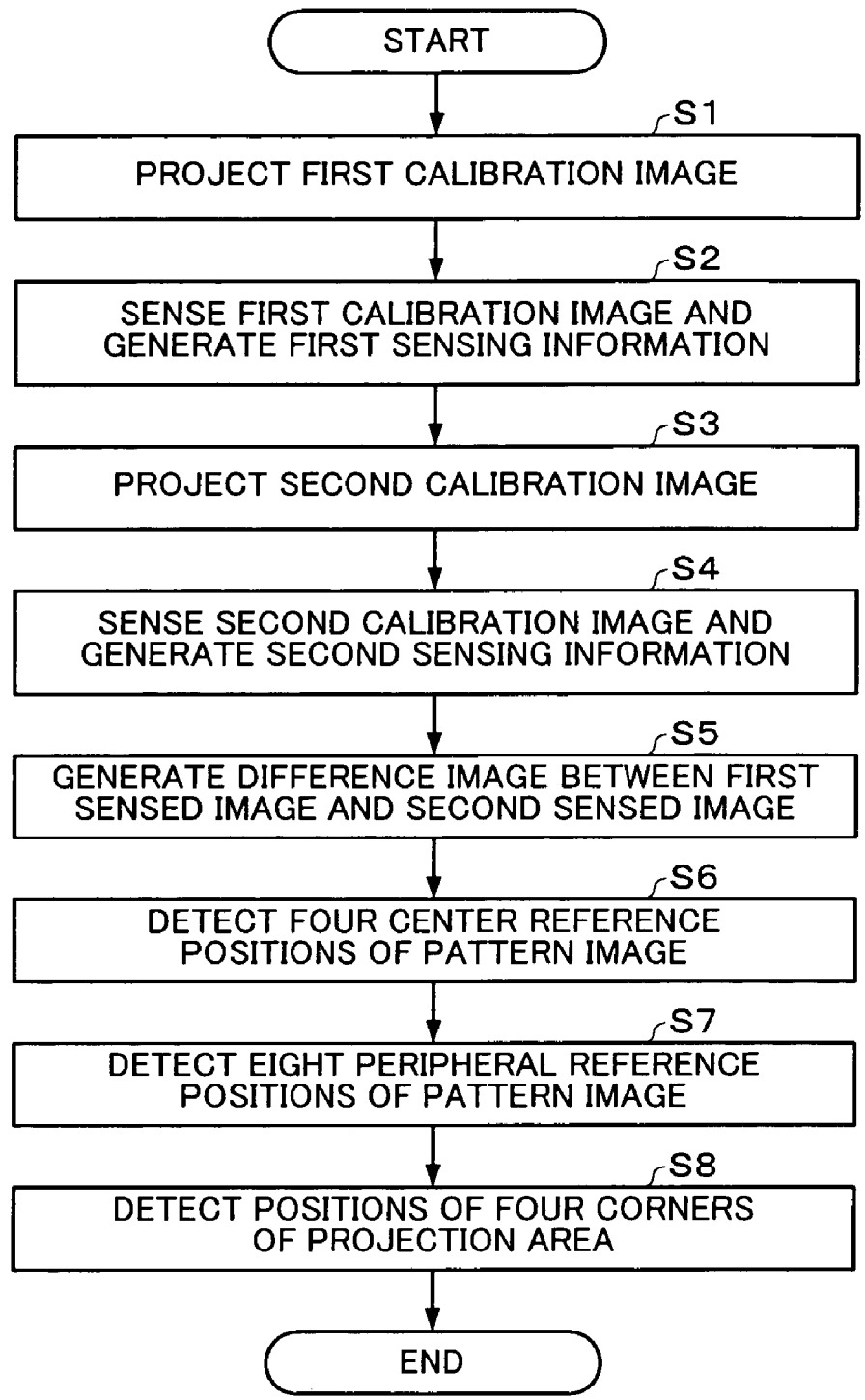
FIG. 5 is a flowchart of position detection processing for a projection area in accordance with the first embodiment.

A flowchart of position detection processing for the projection area in accordance with the first embodiment is shown in FIG. 5. A conceptual view of a first calibration image 13 is shown in FIG. 6A and a conceptual view of a second calibration image 14 is shown in FIG. 6B.

Figure 6A:
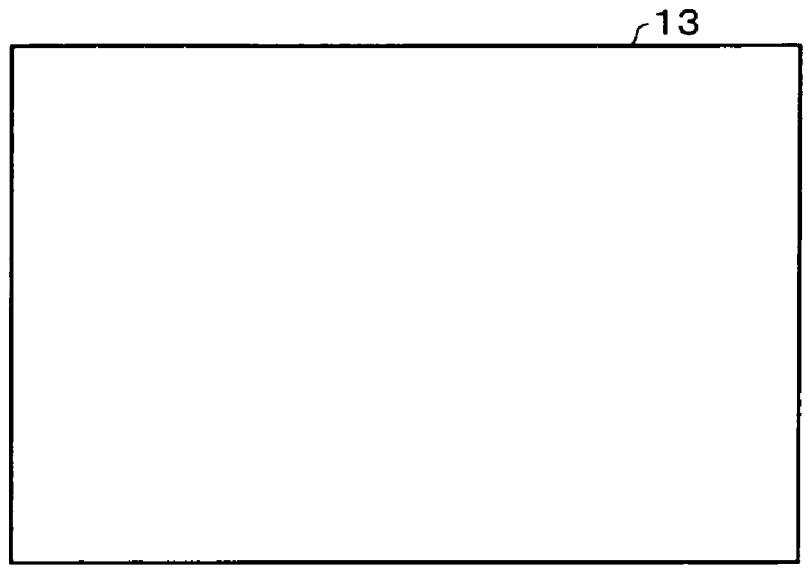
FIG. 6A is a conceptual view of a first calibration image.

The projector 20 first projects an all-white calibration image (in which the entire image is white), as shown in FIG. 6A, as the first calibration image 13 (step S1). More specifically, the calibration information generation section 172 generates calibration information (such as RGB signals) for the first calibration image 13 and the image projection section 190 projects an all-white calibration image based on that calibration information.

The sensor 60 senses the first calibration image 13 at an automatic exposure setting, and generates first sensing information (step S2). The sensing information storage section 140 stores the first sensing information.

Figure 6B:
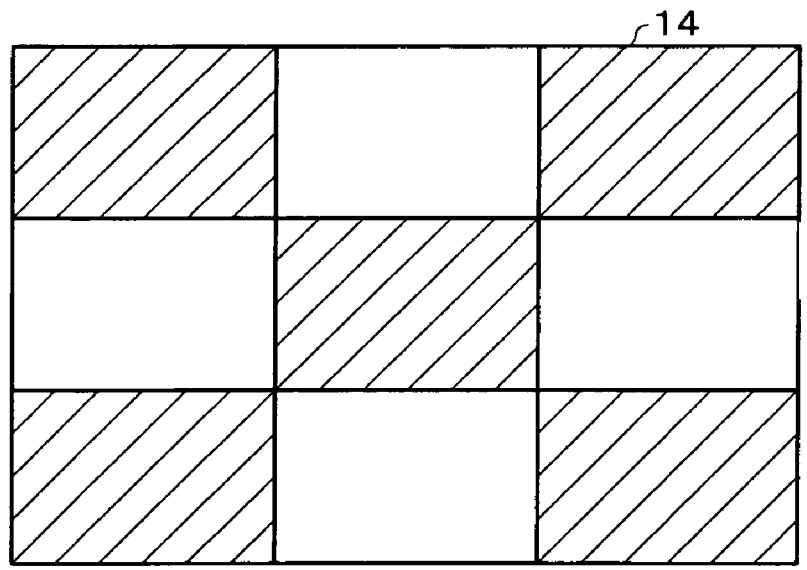
FIG. 6B shows a conceptual view of a second calibration image.

The projector 20 then projects the second calibration image 14 shown in FIG. 6B as the second calibration image 14 (step S3). More specifically, the calibration information generation section 172 generates calibration information for the second calibration image 14 and the image projection section 190 projects the second calibration image 14 based on that calibration information.

In this embodiment, the second calibration image 14 is a pattern image of a checker pattern such that, if the entire image is divided into nine equal blocks, the center block and the four peripheral block areas at the four corners are black and the remaining block areas are white.

The sensor 60 senses the second calibration image 14 on the screen 10 at the same exposure as that for the first calibration image 13, and generates second sensing information (step S4). The sensing information storage section 140 stores the second sensing information.

The difference image generation section 152 generates a difference image between the first calibration image 13 and the second calibration image 14, based on the first and second sensing information (step S5). Note that this difference image is an image obtained by calculating differences such as those of luminance values for each pixel, by way of example. This difference image could be an image having a difference value for each pixel if that difference value exceeds a predetermined threshold at that pixel, but the value is zero at all other pixel positions, by way of example. Note that the difference image generation section 152 need not necessarily calculate differences for the entire image; it could also calculate differences only within an area (a portion of the image) that is necessary for the processing described below.

After the difference image is generated, the projection area detection section 150 detects a plurality of center reference positions (four in this embodiment) of the center block area comprised within the difference image and a plurality of peripheral reference positions (eight in this embodiment) comprised within the difference image.

Figure 7:
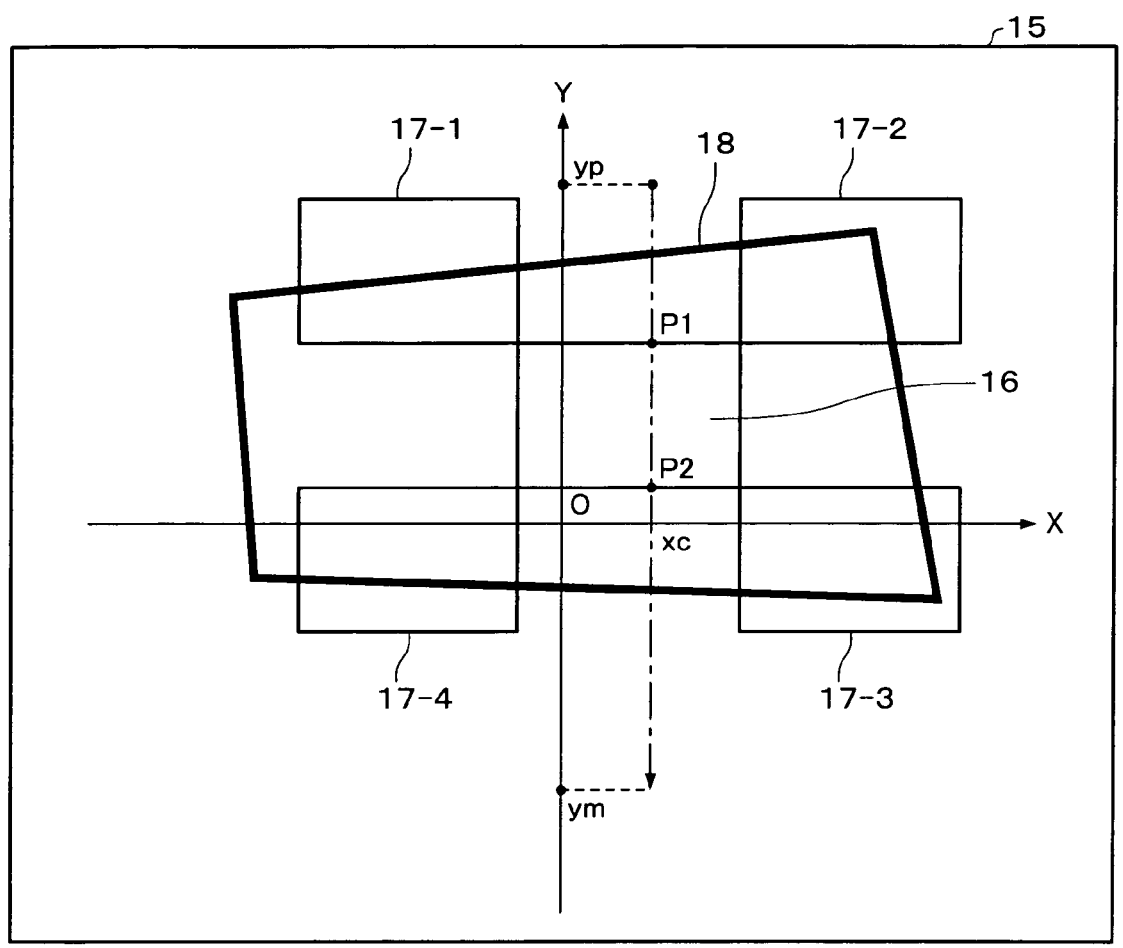
FIG. 7 is a conceptual view of a search method in a first stage of a detection of center reference positions in accordance with the first embodiment.
Figure 8:
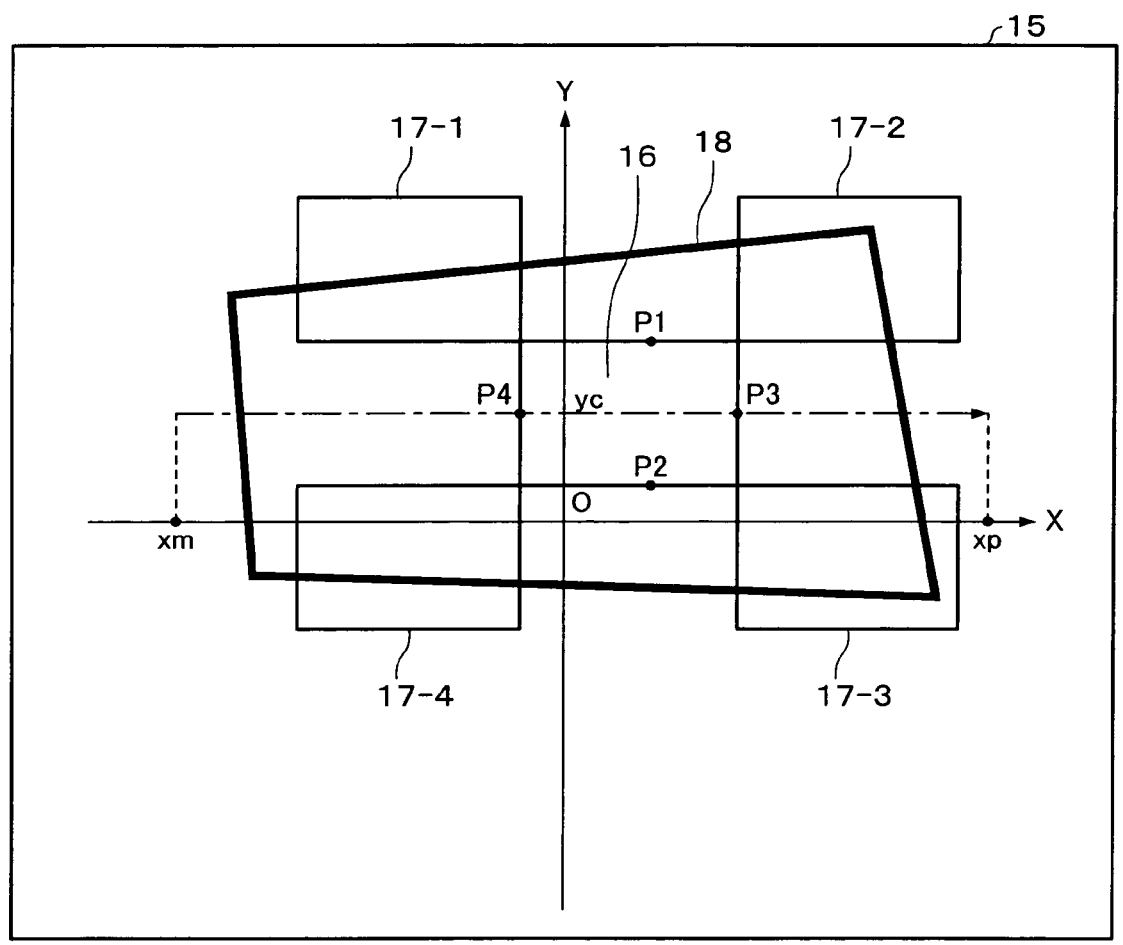
FIG. 8 is a conceptual view of a search method in a second stage of the detection of the center reference positions in accordance with the first embodiment.

A conceptual view of a search method in a first stage in the detection of the center reference positions in the first embodiment is shown in FIG. 7. A conceptual view of a search method in a second stage in the detection of the center reference positions in the first embodiment is shown in FIG. 8.

The center reference position detection section 154 first detects the four center reference positions of the pattern image, in order to detect the position of the projection area (the area corresponding to the projection image 12) in a sensing area 15 corresponding to the sensing screen (step S6). Note that a projection-target area (screen area) 18 is shown in these figures to facilitate comprehension of the description, but it is possible that the projection-target area 18 and some of peripheral block areas 17-1 to 17-4 that are outside of the projection-target area 18 will not exist in the difference image in practice.

More specifically, the center reference position detection section 154 identifies points P1 and P2 at which difference values change, by searching the difference values in the difference image for each pixel from y=yp to y=ym along a vertical line x=xc that is assumed to be positioned on a center block area 16, as shown in FIG. 7. Assume, by way of example that the coordinates of these two points are P1 (xc, y1) and P2 (xc, y2).

Note that values such as xc, yp, and ym for the search reference position could be determined by the angle of view and position of each of the lens 198 and the sensor 60, or they could be determined by experimentation, or they could be determined based on experimentation, by way of example. This also concerns other search reference positions used later in this description.

The center reference position detection section 154 then identifies points P4 and P3 at which difference values change, by searching the difference values in the difference image for each pixel from x=xm to x=xp along a horizontal line y=yc referenced to P1 and P2, as shown in FIG. 8. Note that in this case yc=(y1+y2)/2, by way of example.

Thus the center reference position detection section 154 outputs center reference positional information indicating the four center reference positions P1 (xc, y1), P2 (xc, y2), P3 (x1, yc), and P4 (x2, yc) of the center block area 16 to the peripheral reference position detection section 156.

The peripheral reference position detection section 156 detects the eight peripheral reference positions of the pattern image, based on the center reference positional information (step S7).

Figure 9:
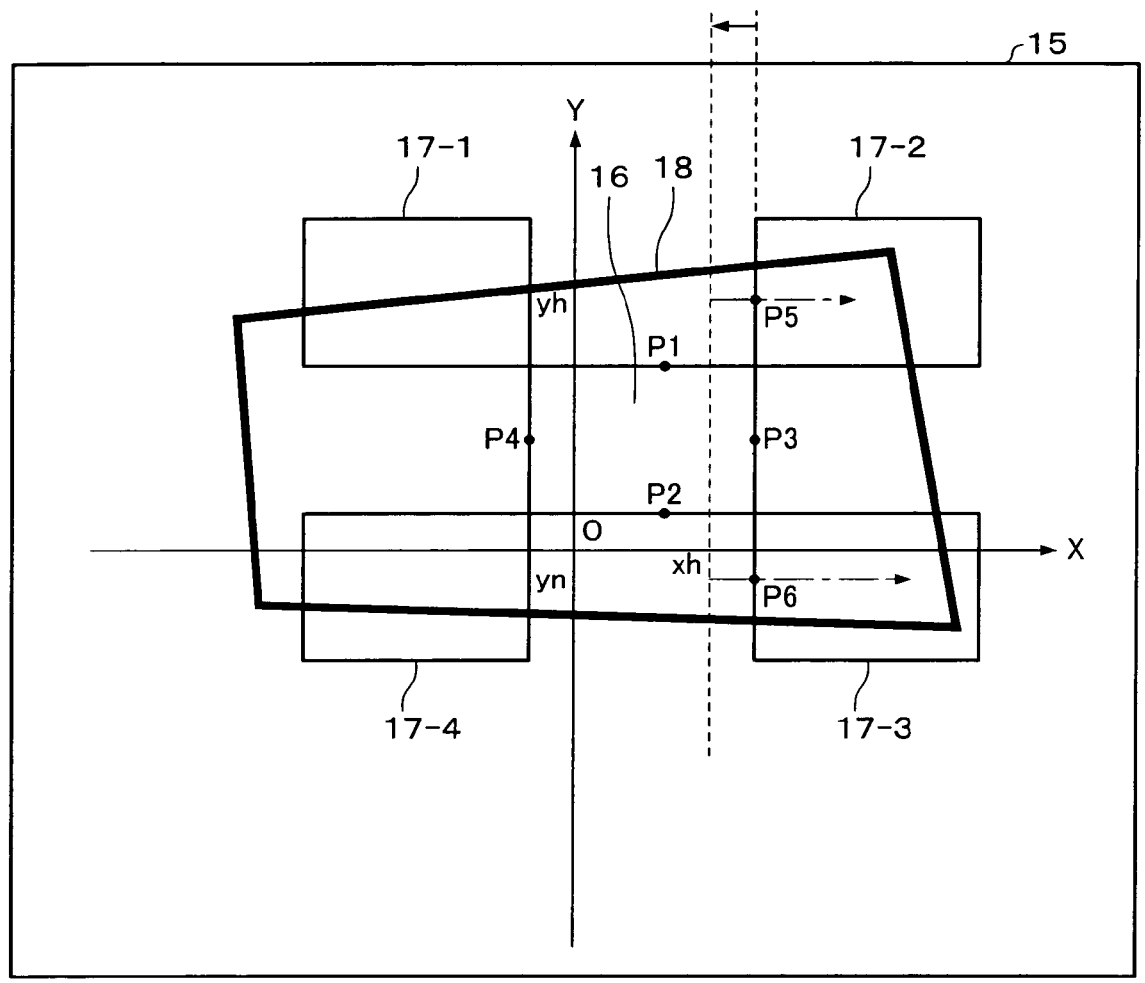
FIG. 9 is a conceptual view of a search method in a first stage of detection of peripheral reference positions in accordance with the first embodiment.

A conceptual view of a search method in a first stage in the detection of the peripheral reference positions in accordance with the first embodiment is shown in FIG. 9. Similarly, a conceptual view of a search method in a second stage in the detection of the peripheral reference positions in accordance with the first embodiment is shown in FIG. 10.

More specifically, the peripheral reference position detection section 156 searches for a point at which there is a change in difference value in the pixels of the difference image, along the line y=yh that is m % above the y-coordinate y1 of P1, in the positive direction of the x-axis from the x-coordinate xh that is a few percent on the center side from the x-coordinate x1 of P3. This identifies a point P5 at which the difference values change.

Similarly, the peripheral reference position detection section 156 searches for a point at which there is a change in difference value in the pixels of the difference image, along the line y=yn that is m % below the y-coordinate y2 of P2, in the positive direction of the x-axis from the x-coordinate xh. This identifies a point P6 at which the difference values change.

Figure 10:
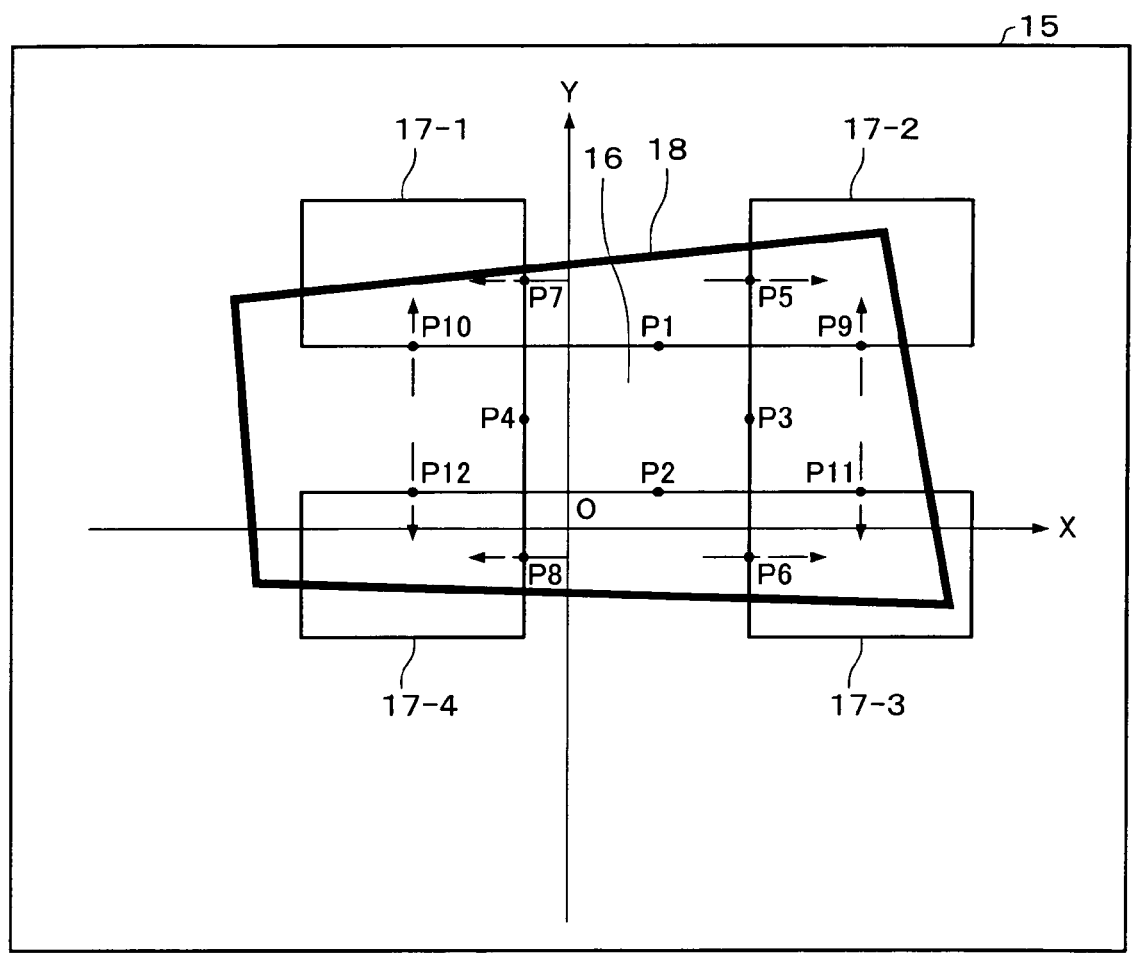
FIG. 10 is a conceptual view of a search method in a second stage of the detection of the peripheral reference positions in accordance with the first embodiment.

By a similar method, points P7 to P12 are identified, as shown in FIG. 10. The peripheral reference position detection section 156 then outputs peripheral reference positional information indicating the coordinates of these eight points and center reference positional information to the projection area information generation section 158.

The projection area information generation section 158 uses approximated straight lines (or approximated curves) based on the peripheral reference positional information and the center reference positional information, to detect the positions of the four corners of the projection area (step S8).

Figure 11:
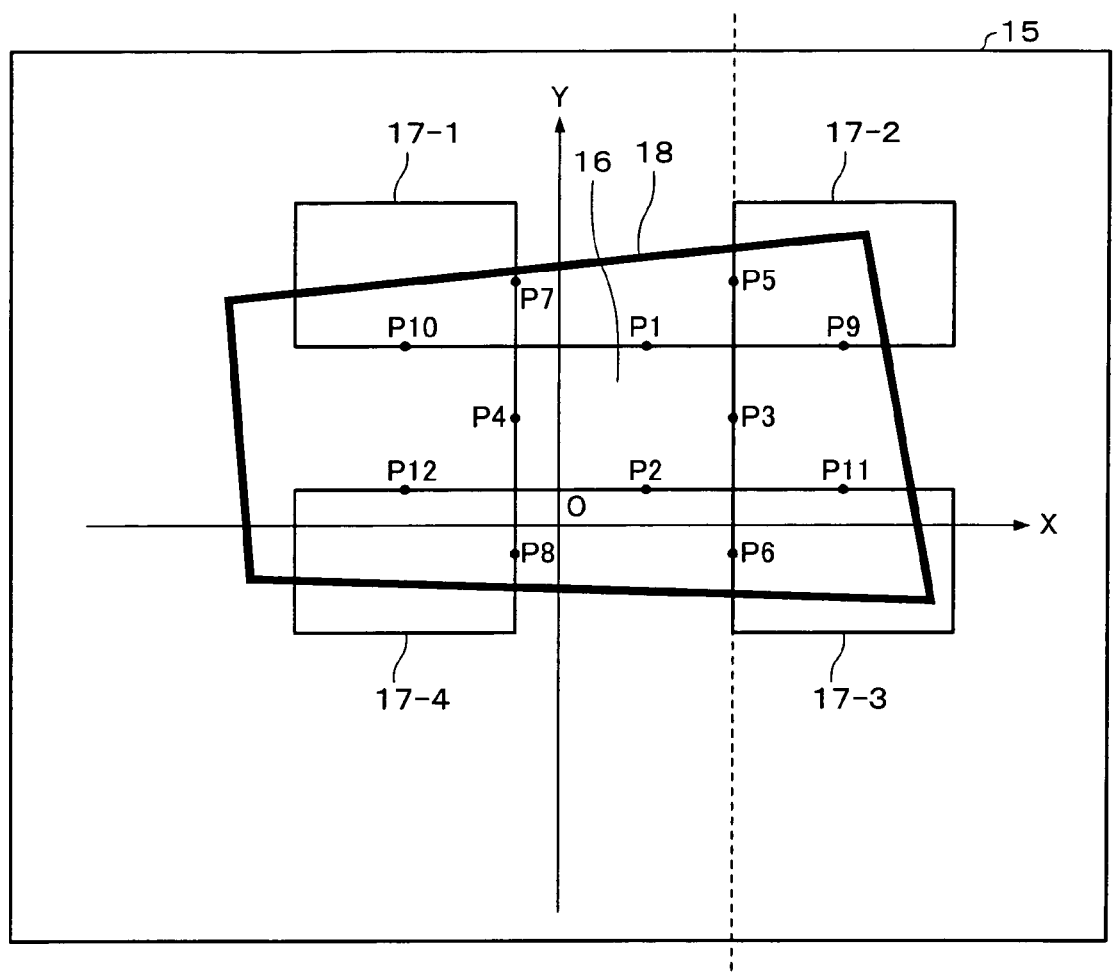
FIG. 11 is a conceptual view of a first stage of setting approximated straight lines in accordance with the first embodiment.
Figure 12:
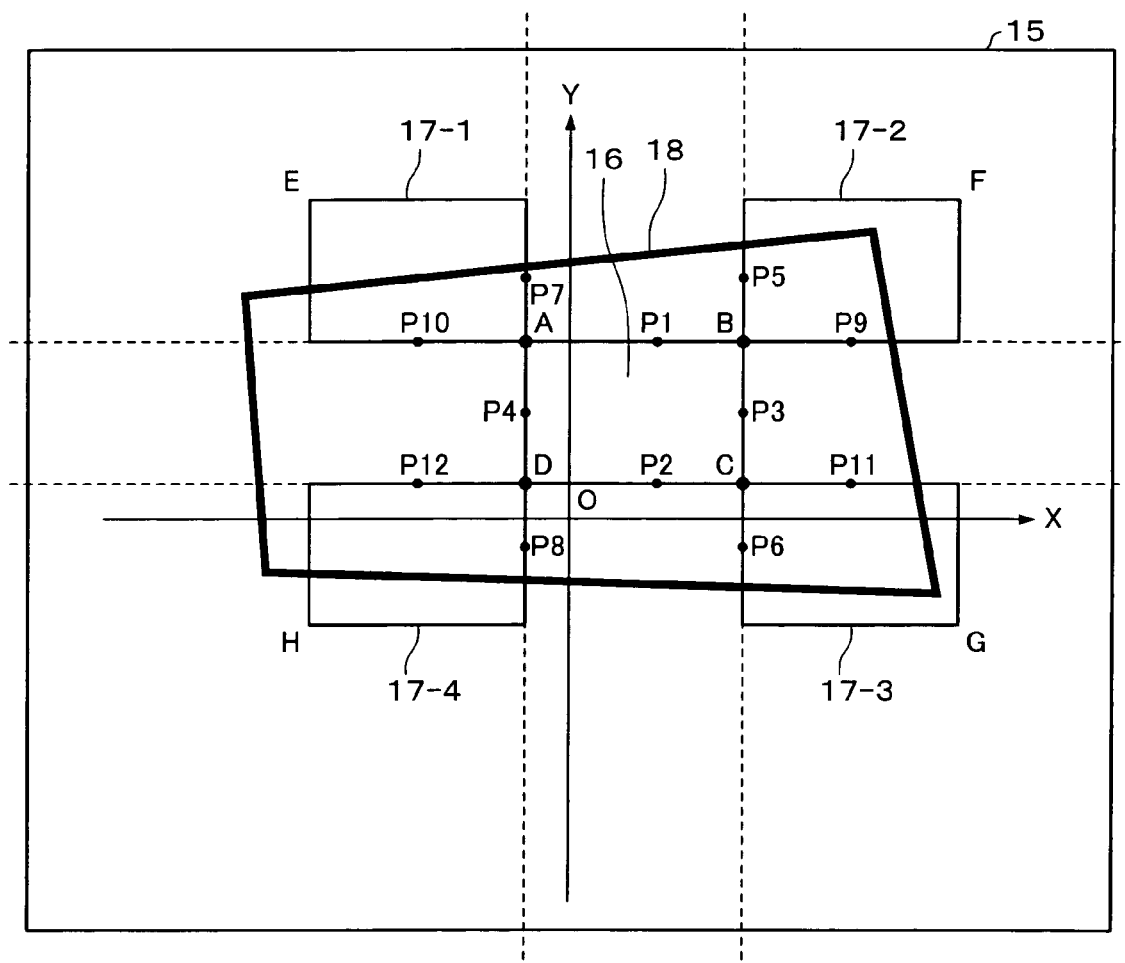
FIG. 12 is a conceptual view of a second stage of setting approximated straight lines in accordance with the first embodiment.

A conceptual view of a first stage of setting approximated straight lines in accordance with the first embodiment is shown in FIG. 11. A conceptual view of a second stage of setting approximated straight lines in accordance with the first embodiment is shown in FIG. 12.

The projection area information generation section 158 sets an approximated straight line, as shown by the broken line in FIG. 11, based on the coordinates of points P5, P3, and P6. By a similar method, the projection area information generation section 158 sets four approximated straight lines, as shown by the broken lines in FIG. 12, and identifies four intersections A (xA, yA) to D (xD, yD) between these approximated straight lines as the four corners of the center block area 16.

Since the center block area 16 has an area corresponding to an image that is shrunk to ⅕th of the original projection image 12, the description below assumes that the points EFGH of the four corners of the projection area correspond to the projection image 12. In other words, E (xE, yE)=(2*xA−xC, 2*yA−yc), F (xF, yF)=(2*xB−xD, 2*yB−yD), G (xG, yG)=(2*xC−xA, 2*yC−yA), and H (xH, yH)=(2*xD−xB, 2*yD−yB).

As described above, this embodiment can detect the positions of the four corners of the projection area in the sensing area 15, inevitably when the projection image 12 is comprised within the screen 10, but also when part of the projection image 12 is displayed outside the screen 10. Of course it is also possible for the projector 20 to convert the positional information of the projection area into the plane of the screen 10, to generate positional information for the four corners of the projection image 12.

This enables the projector 20 to correct distortion of the projection image 12 or adjust the position thereof, and also perform suitable detection of a position that is indicated by using a laser pointer or the like within the projection image 12.

If the projector 20 performs correction (known as keystone correction) of the projection image 12, by way of example, the luminance peak position detection section 164 is used to detect the luminance peak position at which the luminance value is at a maximum within the projection area within the sensing area, based on the sensing information for the first calibration image 13 and the projection area information that indicates the four corners of the projection area from the projection area information generation section 158.

If the screen 10 and the projector 20 are face-on to each other, for example, the center of the projection area would be the luminance peak position. Alternatively, if the luminance values on the left side of the projection area are high, it is possible to determine that the optical axis of the projection has slipped toward the left from the center of the projection image 12, and thus it is possible to determined that the projection image 12 is deformed into a lozenge shape in which the left side is shorter and the right side longer. Thus the distortion of the image can be determined by determining the luminance peak position within the projection area.

The image distortion correction amount calculation section 162 calculates a correction amount corresponding to the image distortion, based on the luminance peak position within the projection area.

The image distortion correction section 112 within the input signal processing section 110 then corrects the input image signal in such a manner that the distortion of the image is corrected, based on that correction amount.

With the above sequence, the projector 20 can correct distortion of the image, even when part of the projection image 12 is displayed outside of the screen 10. It should be obvious to those skilled in the art that the method of correcting image distortion is not limited to this method. For example, the projector 20 could detect the pixel that has the greatest luminance value within the sensed image and base the correction of distortion of that image on the position of that pixel.

The projector 20 could also identify the four corners of the projection area to a higher precision than that obtained by using a pattern image that has a feature only at the center, by using an image that has features at the periphery thereof in addition to the center, such as the pattern image shown in FIG. 6B.

For example, during the identification of the points P1 and P2 in FIG. 7, the projector 20 could also identify points at which the luminance value in the vicinity thereof changes. However, when an approximated straight line is set by using a plurality of points at such a narrow spacing, an error of one pixel in a point that is the origin of the approximated straight line can have a greater effect than in an approximated straight line formed by using a plurality of points at a wider spacing.

Since this embodiment enables the projector 20 to set approximated straight lines by using a plurality of points at wider spacing, by using the reference points of the center block area 16 and the reference points of the peripheral block areas 17-1 to 17-4, it is possible to identify the four corners of the projection area at a higher precision.

This enables the projector 20 to determine the position of the entire projection area very precisely, avoiding the effects of shading of the projector 20 or the sensor 60.

In addition, this embodiment enables the projector 20 to detect the position of the projection area more easily and also more rapidly, by searching only the necessary areas of the difference image, not the entire difference image.

The first sensing information can be generated at an exposure suited to the usage environment by sensing the all-white image at a temporary automatic exposure setting and generating the corresponding first sensing information, during the projection of the calibration images. The projector 20 can also generate the second sensing information at an exposure suited to the generation of the difference image, by generating the second sensing information at the exposure used during the sensing of the all-white image.

In particular, by sensing an all-white image at the automatic exposure setting, the sensor 60 can utilize the dynamic range of the sensor 60 more effectively than in a method of sensing images at a fixed exposure, even when the screen 10 is affected by ambient light, when the reflection of the projected light is too weak because the projection distance is too great or the reflectivity of the screen 10 is too low, or when reflection of the projected light is too strong because the projection distance is too close or the reflectivity of the screen 10 is too high.

Modification of First Embodiment

The description above concerned a first embodiment of the present invention, but the application of the present invention is not limited to the above-described embodiment.

For example, the searching can be done in any sequence, so that the projector 20 could first search in the lateral direction with respect to the difference image to detect a center reference position or a peripheral reference position, then base a search in the vertical direction on that center reference position or that peripheral reference position.

Similarly, the projector 20 could perform various different processings by using the positional information for the projection area, such as correcting color variations within the projection area or detecting an indicated position within the projection area, based on the projection area information, other than the correction of image distortion based on the projection area information.

The projector 20 could also detect the projection area after detecting the projection-target area 18.

Figure 13:
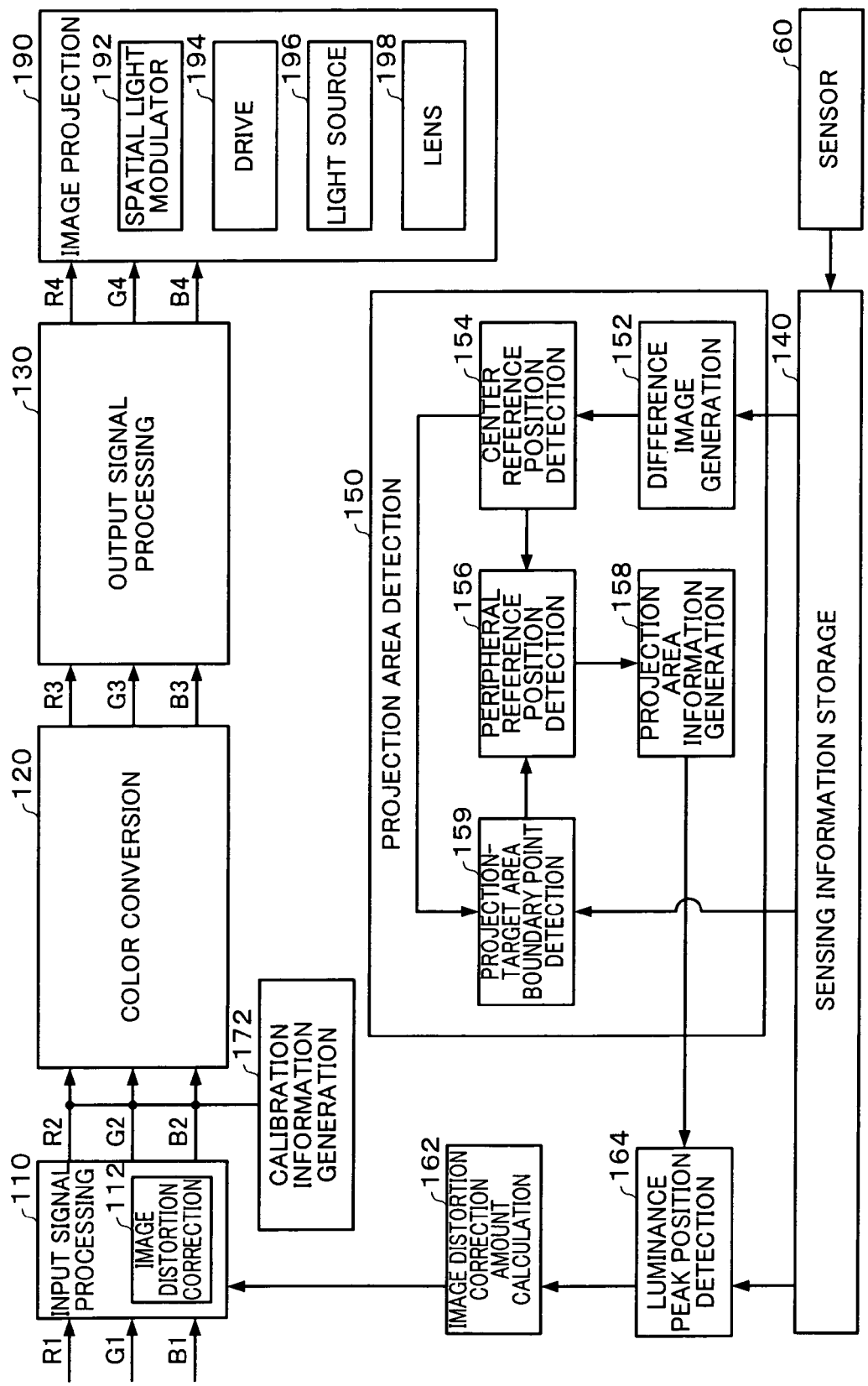
FIG. 13 is a functional block diagram of a projector in accordance with a modification of the first embodiment.
Figure 14:
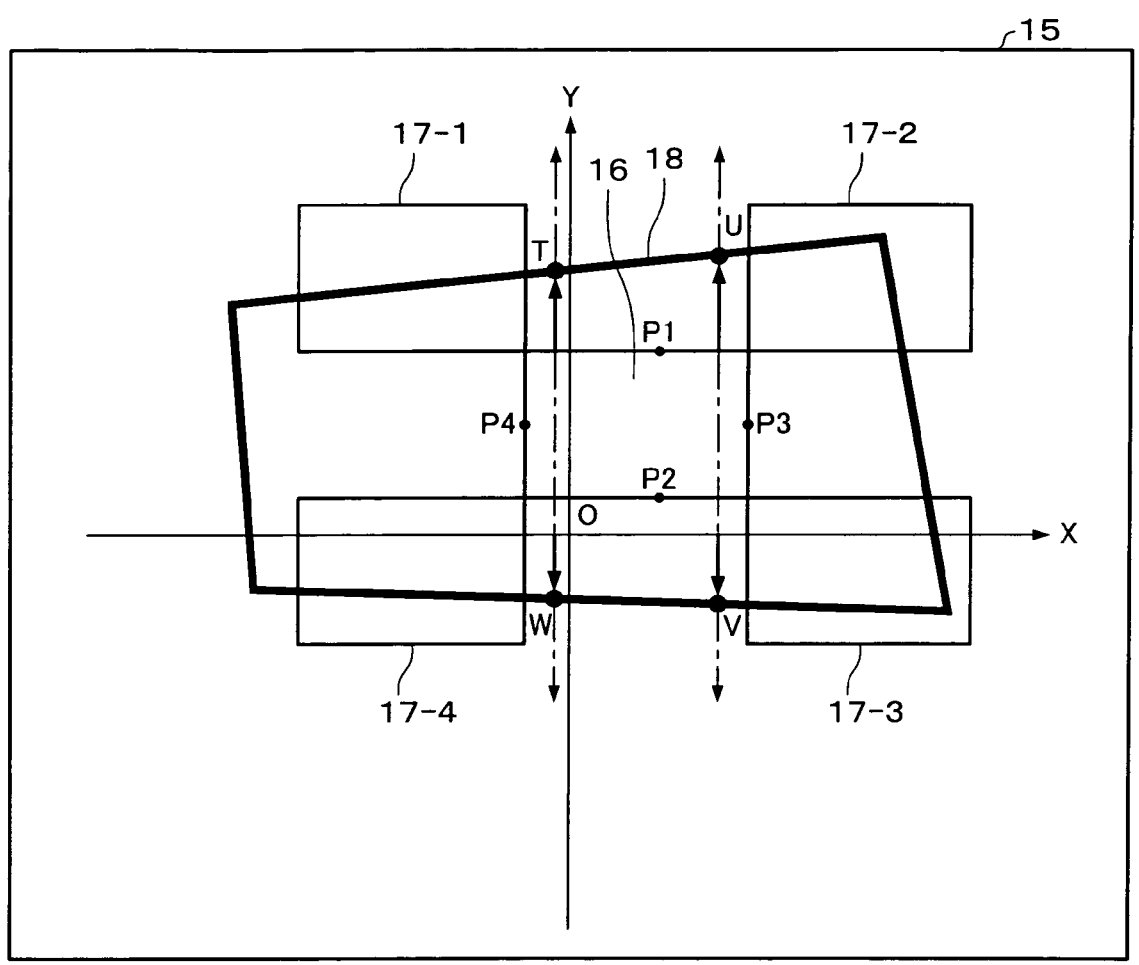
FIG. 14 is a conceptual view of a search method in a first stage of a detection of peripheral reference positions in a modification of the first embodiment.
Figure 15:
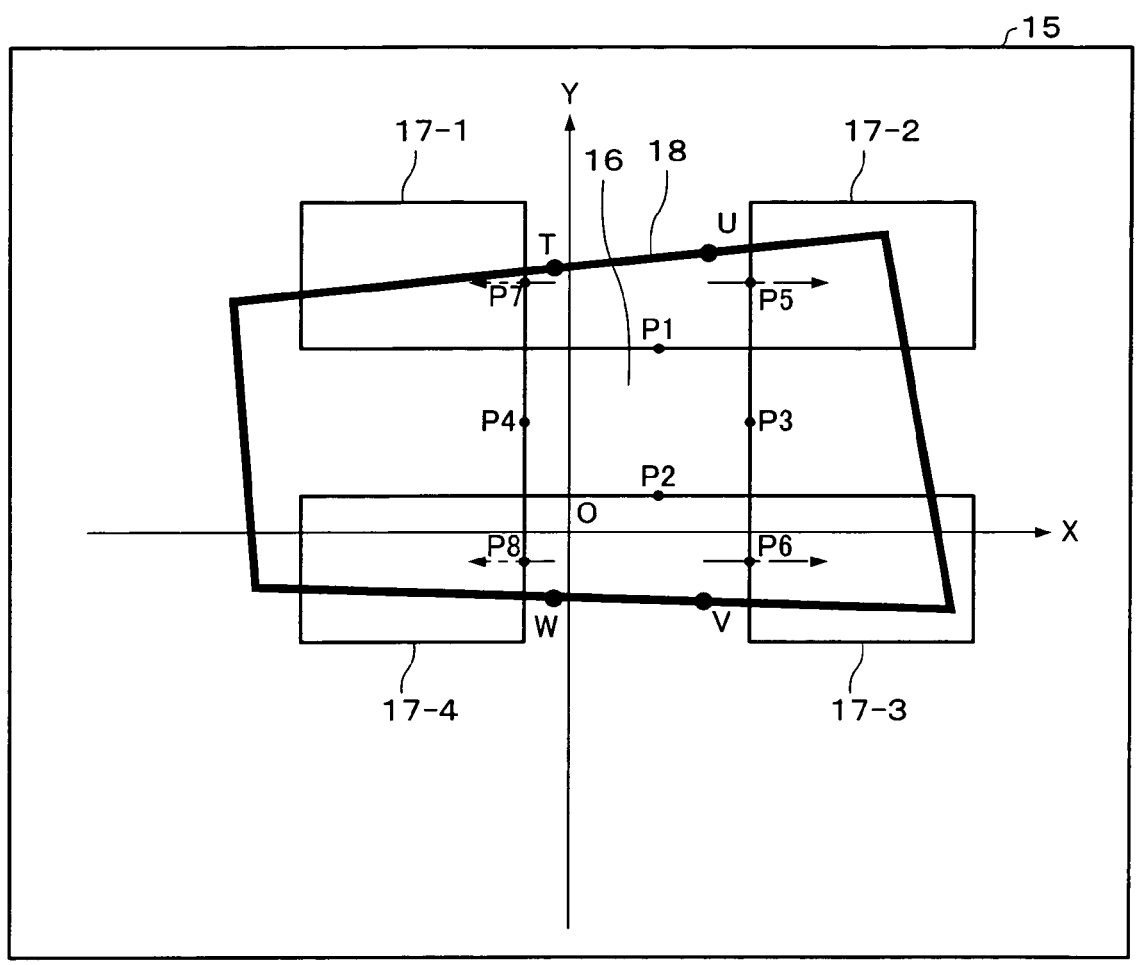
FIG. 15 is a conceptual view of a search method in a second stage of the detection of the peripheral reference positions in the modification of the first embodiment.

A functional block diagram of the projector 20 in accordance with a modification of the first embodiment is shown in FIG. 13. A conceptual view of a search method in a first stage in the detection of the peripheral reference positions in this modification of the first embodiment is shown in FIG. 14. Similarly, a conceptual view of a search method in a second stage in the detection of the peripheral reference positions in this modification of the first embodiment is shown in FIG. 15.

A projection-target area boundary point detection section 159 is provided within the projection area detection section 150, as shown by way of example in FIG. 13.

The center reference position detection section 154 outputs center reference positional information to the projection-target area boundary point detection section 159.

The projection-target area boundary point detection section 159 searches the first sensed image towards the outer sides of the center block area 16 from intersections between lines each of which is positioned a few percent within the center block area 16 from each of the points P3 and P4 and each of the lines y=y1 and y=y2, to detect edges with respect to pixels on the lines each of which is positioned a few percent within the center block area 16 from each of the points P3 and P4, as shown in FIG. 14. Note that a generic method is used in the edge detection. This identifies points T, U, V, and W, as shown in FIG. 14. The projection-target area boundary point detection section 159 outputs projection-target area boundary point information indicating the positions of the points T, U, V, and W to the peripheral reference position detection section 156.

The peripheral reference position detection section 156 detects a position Y=yQ to act as reference for a search in the lateral direction on the upper side, based on whichever is the smaller value of yT that is the Y-coordinate of the point T and yU that is the Y-coordinate of the point U, together with y1 that is the Y-coordinate of the point P1. Similarly, the peripheral reference position detection section 156 detects a position Y=yR to act as reference for a search in the lateral direction on the lower side, based on whichever is the smaller value of yV that is the Y-coordinate of the point V and yW that is the Y-coordinate of the point W, together with y2 that is the Y-coordinate of the point P2.

The peripheral reference position detection section 156 identifies four points P5 to P8 by searching outward on the lines Y=yQ and Y=yR in the difference image from each of the intersections between the four straight lines X=xt, X=xU, Y=yQ, and Y=yR, and detecting pixels that are output. The peripheral reference position detection section 156 identifies the remaining four points P9 to P12 by a similar method.

The projection area detection section 150 can identify the center reference positions of the center block area 16 and the peripheral reference positions of the peripheral block areas 17-1 to 17-4 by such a method, to identify the positions of the four corners of the projection area.

In particular, such a method enables the projection area information generation section 158 to avoid unwanted processing for detecting peripheral reference positions outside the projection-target area, in comparison with the previously described method, and also enables it to obtain an approximated straight line in a state in which the three points for deriving that approximated straight line are further apart. This enables the projector 20 to detect the position of the projection area to a higher precision.

Second Embodiment

The projector 20 in accordance with the second embodiment determines the positional relationship between the screen 10 and the projection image 12 and also the shape of the projection image 12, based on sensing information, and adjusts distortion of the projection image 12 and the display position thereof.

The projector 20 of the second embodiment generates positional information for a projection-target area (an area corresponding to the screen 10) in a projection-target area within the sensing area of the sensor 60 and a projection area (an area corresponding to the projection image 12), within a shorter time and also more accurately, by performing image processing that differs from that in the prior art.

The description now turns to function blocks of the projector 20 for implementing such functions.

Figure 16:
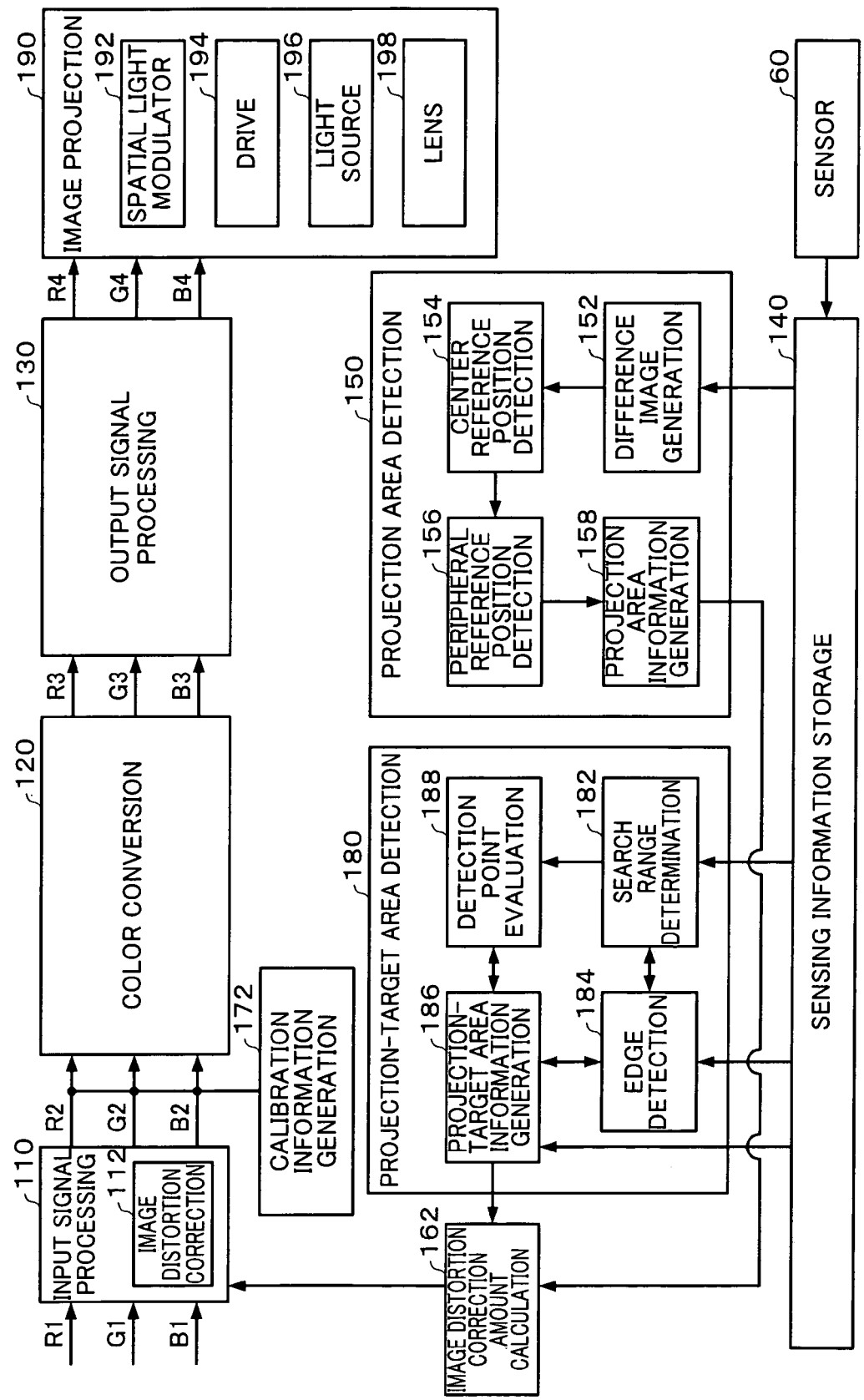
FIG. 16 is a functional block diagram of a projector in accordance with a second embodiment.

A functional block diagram of the projector 20 of the second embodiment is shown in FIG. 16.

The projector 20 comprises the input signal processing section 110 that converts analog RGB signals (R1, G1, and B1) that are input from a personal computer (PC) or the like, into digital RGB signals (R2, G2, and B2); the color conversion section 120 that converts those digital RGB signals (R2, G2, and B2) into digital RGB signals (R3, G3, and B3), in order to correct the color and brightness of the image; the output signal processing section 130 that converts those digital RGB signals (R3, G3, and B3) into analog RGB signals (R4, G4, and B4); and the image projection section 190 that projects an image based on those analog RGB signals.

The image projection section 190 comprises the spatial light modulator 192, the drive section 194 for driving the spatial light modulator 192, the light source 196, and the lens 198. The drive section 194 drives the spatial light modulator 192, based on analog RGB signals from the output signal processing section 130. The image projection section 190 projects light from the light source 196 through the spatial light modulator 192 and the lens 198.

The projector 20 also comprises the calibration information generation section 172 that generates calibration information for displaying first and second calibration images; the sensor 60 that generates sensing information for the calibration images; and the sensing information storage section 140 that temporarily stores sensing information from the sensor 60.

The projector 20 further comprises the projection area detection section 150 that detects the position of the projection area in the sensing screen (sensing area) of the sensor 60, based on the sensing information. The projection area detection section 150 comprises the difference image generation section 152 that generates a difference image between the first sensed image and the second sensed image, the center reference position detection section 154 that detects a plurality of center reference positions of the center block area comprised within the difference image, the peripheral reference position detection section 156 that detects a plurality of peripheral reference positions of peripheral block areas comprised within the difference image, and the projection area information generation section 158 that generates projection area information indicating the position of the projection area, based on the reference positions.

The projector 20 also comprises a projection-target area detection section 180 that generates projection-target area information relating to the position of the projection-target area that corresponds to the screen 10 in the sensing area of the sensor 60. The projection-target area detection section 180 comprises a search area determination section 182 that sets an edge detection area, an edge detection section 184, a detection point evaluation section 188 that evaluates edge detection points, and a projection-target area information generation section 186 that generates provisional detection information from a provisional detection of the projection-target area and also generates projection-target area information.

The projector 20 also has image distortion correction means that corrects distortion of the projection image 12. More specifically, the projector 20 has the image distortion correction amount calculation section 162 that calculates the amount of image distortion correction, based on the projection area information, the projection-target area information, and the projectable area information; and the image distortion correction section 112 that corrects the image signal, based on that image distortion correction amount; as the image distortion correction means.

The hardware for implementing the functions of the above-described projector 20 could be as described below with reference to FIG. 4, by way of example.

For example, these functions could be implemented by using the A/D converter 930 and the image processing circuit 970, or the like, as the input signal processing section 110; the RAM 950 or the like as the sensing information storage section 140; the image processing circuit 970 or the like as the projection area detection section 150 and the luminance peak position detection section 164; the CPU 910 or the like as the image distortion correction amount calculation section 162; the image processing circuit 970 and the RAM 950, or the like, as the calibration information generation section 172;

the D/A converter 940 or the like as the output signal processing section 130; the liquid-crystal panel 920 or the like as the spatial light modulator 192; and the ROM 960 or the like which stores a liquid-crystal light valve driver for driving the liquid-crystal panel 920, as the drive section 194.

Note that these components can exchange information between themselves over the system bus 980.

These components could also be implemented in a hardware fashion by circuitry, or in a software manner by drivers or the like.

In addition, the information storage medium 900 which stores a program that causes a computer to function as components such as the projection-target area information generation section 186 could be installed in the computer, and the computer reads out the program in order to function as the projection-target area information generation section 186, etc.

This information storage medium 900 could be a CD-ROM, DVD-ROM, ROM, RAM, or HDD, by way of example, and the method of reading the program therefrom could be a direct method or an indirect method.

Instead of the information storage medium 900, it is also possible to download a program that implements the above-described functions, from a host device through a transfer path, in order to implement the above-described functions.

The description now turns to the projection-target area position detection processing that is performed by using the above-described components. Note that the projection area position detection processing is similar to that of the first embodiment so further description thereof is omitted. This second embodiment differs from the first embodiment shown in FIG. 7 in that it is assumed that the entire projection-target area 18 does not protrude from the peripheral block areas 17-1 to 17-4.

The description below relates to the flow of position detection processing for the projection-target area 18.

Figure 17:
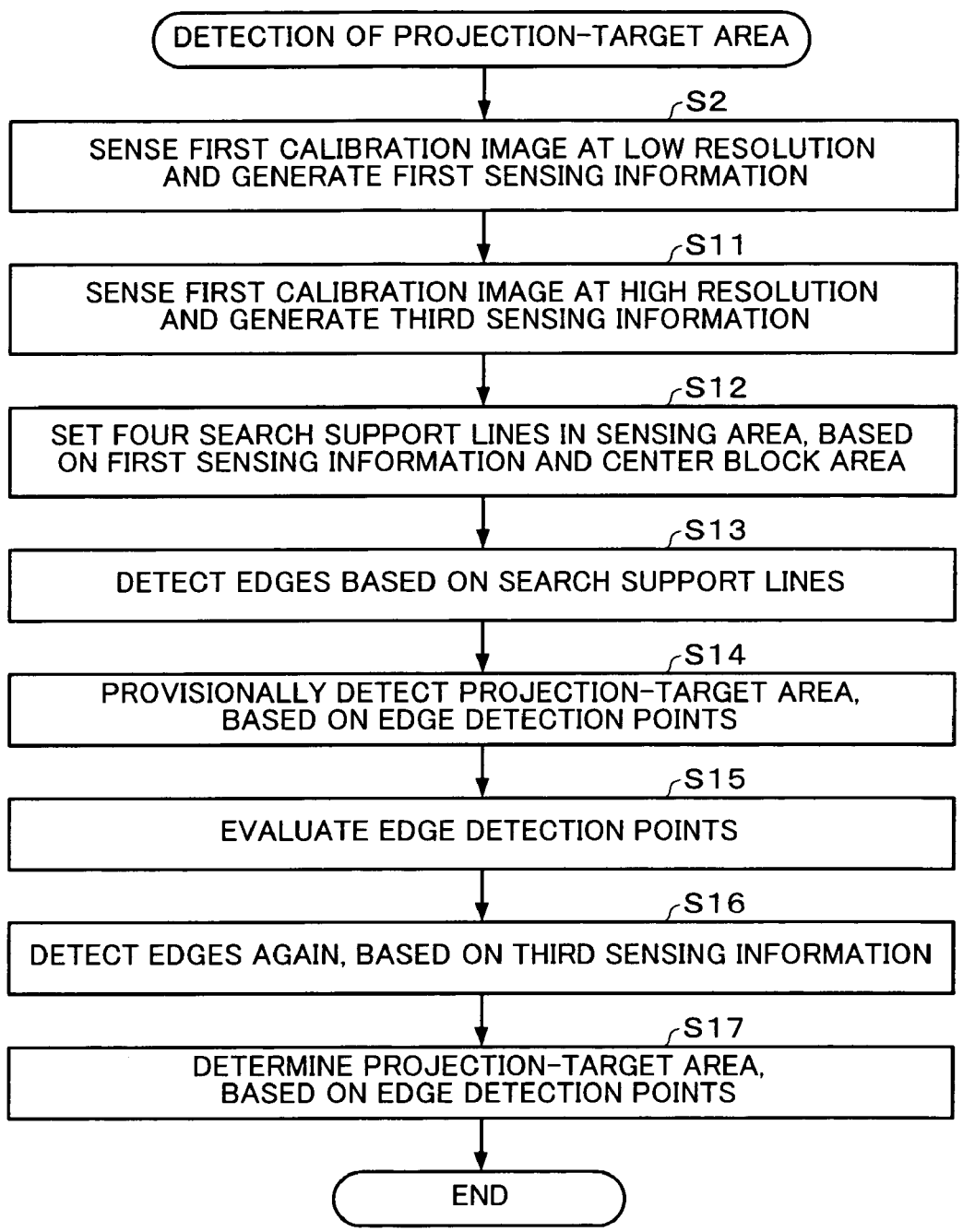
FIG. 17 is a flowchart of position detection processing for a projection-target area in accordance with the second embodiment.

A flowchart of the position detection processing for the projection-target area 18 in accordance with the second embodiment is shown in FIG. 17.

In the processing of step S2 described above, the sensor 60 senses the first calibration image 13 at a resolution (such as VGA) that is lower than a predetermined resolution (such as SVGA), to generate the first sensing information (step S2). The sensing information storage section 140 stores the first sensing information.

While the first calibration image 13 is still projected onto the screen 10, the sensor 60 then senses the first calibration image 13 at a resolution (such as XGA, SXGA, or UXGA) that is higher than the above-described low resolution, to generate the third sensing information (step S11). The sensing information storage section 140 stores the third sensing information.

The projection-target area detection section 180 generates the projection-target area information that indicates positional information of the projection-target area 18, based on the first and third sensing information.

Figure 18:
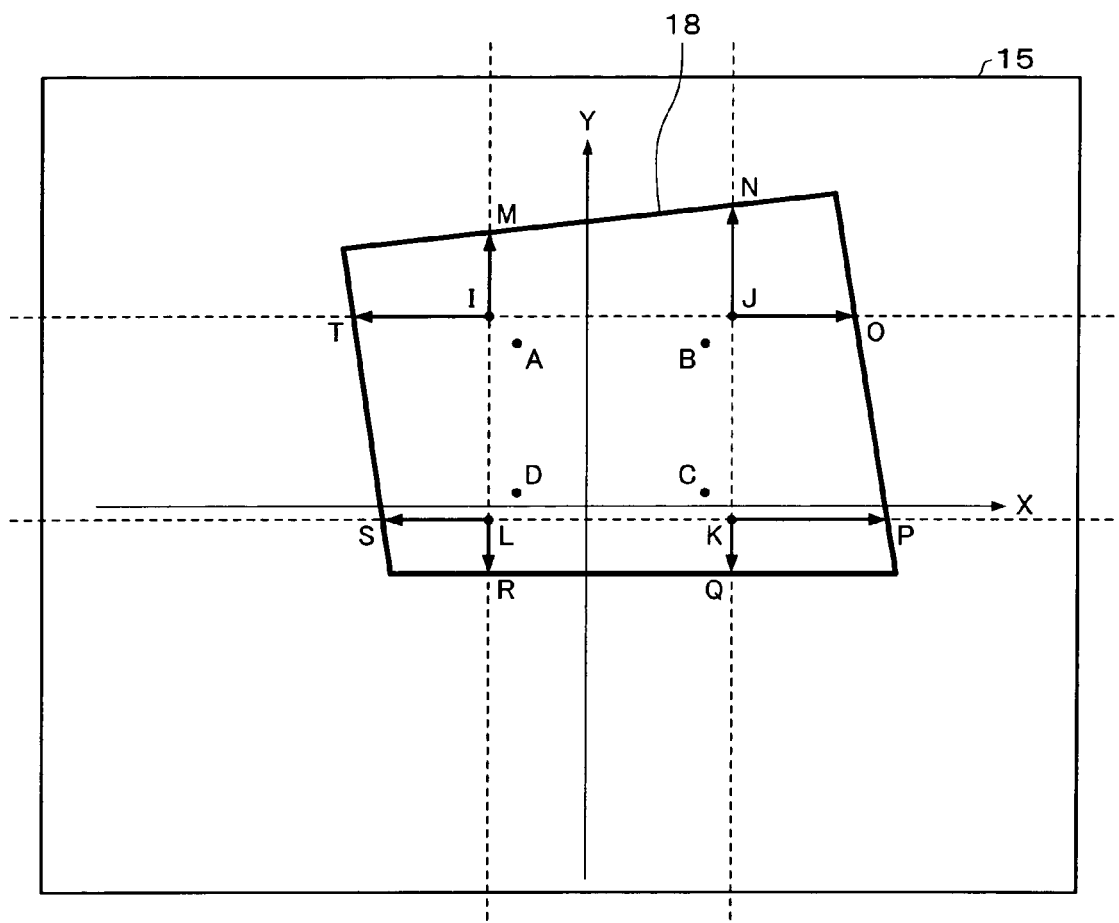
FIG. 18 is a conceptual view of a search method in a first stage of detection of the projection-target area in accordance with the second embodiment.
Figure 19:
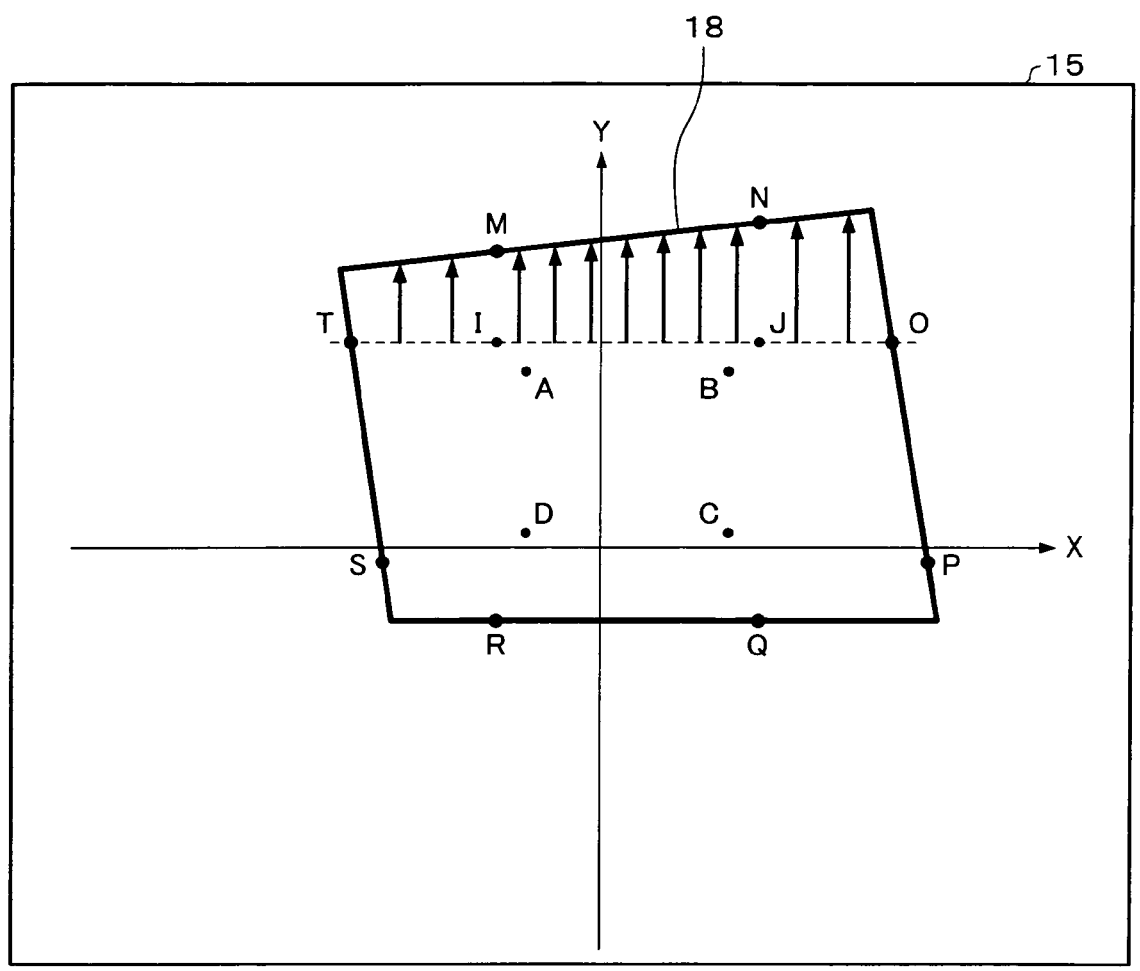
FIG. 19 is a conceptual view of a search method in a second stage of the detection of the projection-target area in accordance with the second embodiment.
Figure 20:
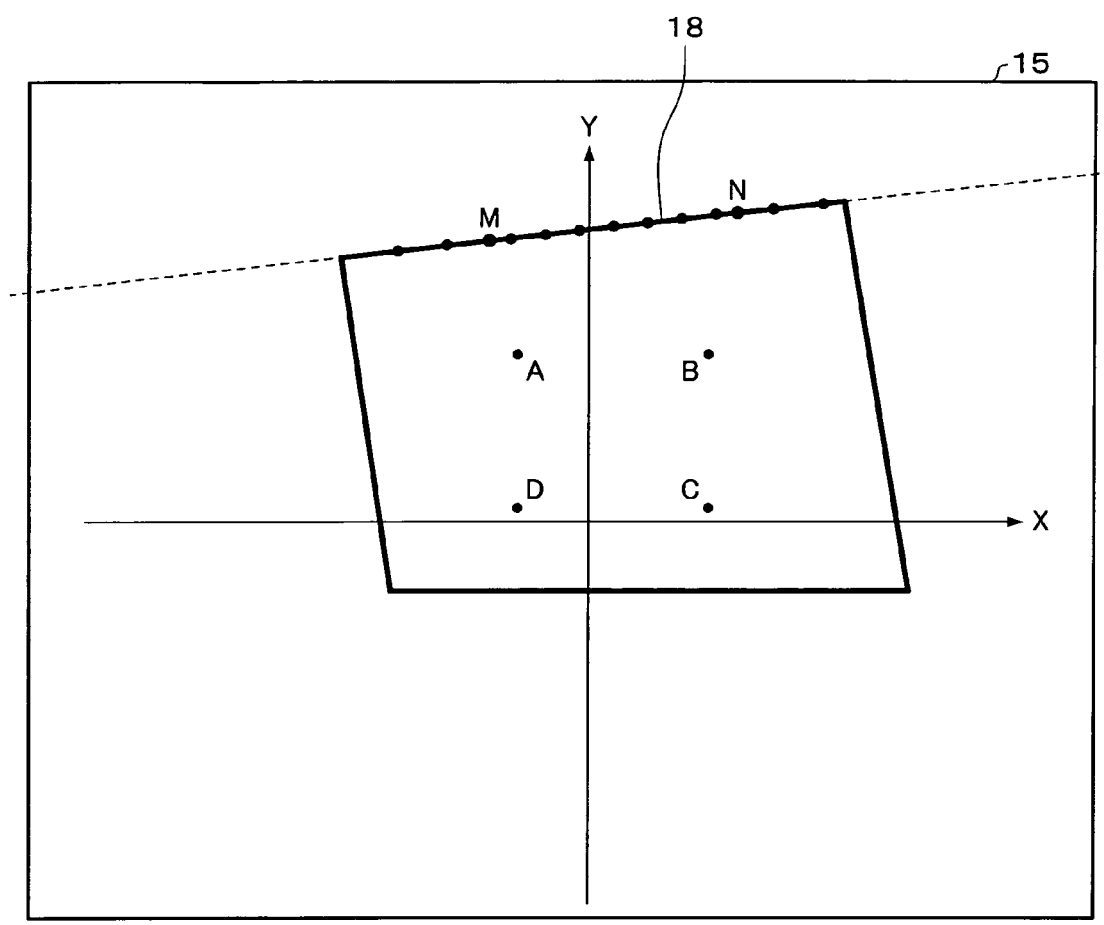
FIG. 20 is a conceptual view of a search method in a third stage of the detection of the projection-target area in accordance with the second embodiment.
Figure 21:
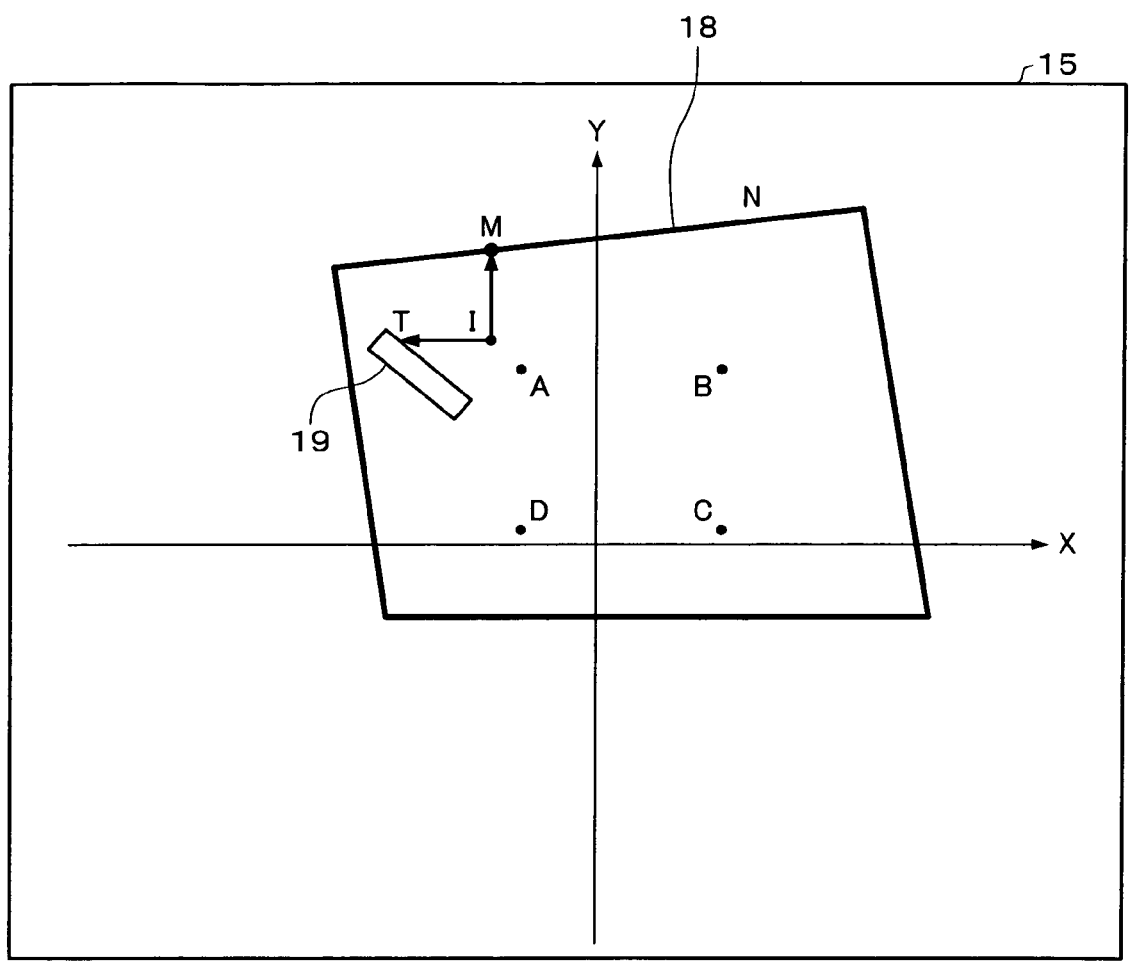
FIG. 21 is a conceptual view of evaluation processing of edge detection points in accordance with the second embodiment.

A conceptual view of a search method in a first stage of the detection of the projection-target area 18 in accordance with the second embodiment is shown in FIG. 18. A conceptual view of a search method in a second stage of the detection of the projection-target area 18 in accordance with the second embodiment is shown in FIG. 19. Similarly, a conceptual view of a search method in a third stage of the detection of the projection-target area 18 in accordance with the second embodiment is shown in FIG. 20. Finally, a conceptual view of edge detection point evaluation processing in accordance with the second embodiment is shown in FIG. 21.

First of all, the search area determination section 182 sets four search support lines in the sensing area, as indicated by broken lines in FIG. 18, based on the first sensing information and coordinates information for the four corners ABCD of the above-described center block area 16, to determining the candidates for edge detection (step S12). More specifically, the search area determination section 182 targets a white-colored sensed image that has been sensed at a low resolution, and sets search support lines that are p % further outward from the coordinates of the four corners ABCD of the center block area 16 detected by the center reference position detection section 154.

For example, the first search support line is given by $y=\text{round}[\{\max(yA,yB)+(yA-yD)*p/100\}*a]$, the second search support line is given by $x=\text{round}[\{\max(xB,xC)+(xB-xA)*p/100\}*a]$, the third search support line is given by $y=\text{round}[\{\min(yC,yD)-(yA-yD)*p/100\}*a]$, and the fourth search support line is given by $x=\text{round}[\{\min(xA,xD)-(xB-xA)*p/100\}*a]$. Note that the terms "max," "min", "round", and "a" in this case are a function that returns the maximum value from among arguments, a function that returns the minimum value from among arguments, a function that returns an integer in which the first place after the decimal point is rounded off, and a coefficient for converting the resolution (high resolution) of the second sensed image into the resolution (low resolution) of the first sensed image. Note that "a" is not necessary if there is no need to convert the resolution.

Setting the four search support lines in this manner makes it possible to determine four intersections IJKL of the four search lines, as shown in FIG. 18.

The edge detection section 184 performs edge detection one pixel at a time, on the first sensed image along the search lines on the search support lines, towards the outer sides of the areas IJKL from the corresponding intersections IJKL (step S13). This enables the detection of eight edge detection points MNOPQRST, as shown in FIG. 18.

In addition, the edge detection section 184 performs edge detection in one-pixel increments in the direction of the boundary line of the projection-target area 18 from a line segment TO, the direction of the boundary line of the projection-target area 18 from a line segment NQ, the direction of the boundary line of the projection-target area 18 from a line segment PS, and the direction of the boundary line of the projection-target area 18 from a line segment RM.

In this case, the description concerns the example of edge detection in the direction of the boundary line of the projection-target area 18 from the line segment TO. The edge detection section 184 sets the area for edge detection for the line segment TO as seven search lines in a line segment IJ and two each in line segments TI and JO, parallel to the Y-axis and in the positive direction, as shown in FIG. 19. Note that the area in which the seven search lines are set is called the inner-side search area and the two areas in which two search lines are set are called the outer-side search areas.

The edge detection section 184 can therefore detect a maximum of eleven edge detection points (thirteen, including the points M and N) on the straight line MN, by performing edge detection one pixel at a time along these search lines. The edge detection section 184 performs similar edge detection for the other line segments NQ, PS, and RM.

Note that if the edge detection section 184 is unable to detect one point of a pair of edge detection points MN, OP, QR, and ST within the sensing area 15, it assumes that there is no boundary line for the projection-target area 18 in the outer-side search area and thus it does not set search lines and detect edges within that area. In addition, if the edge detection section 184 is unable to detect both points of a pair of edge detection points MN, OP, QR, and ST within the sensing area 15, it assumes that there is no boundary line for the projection-target area 18 in the vicinity of the direction parallel to the line segment that it was unable to detect, and thus it does not set search lines and detect edges in order to search for the line segment it cannot detect, within the inner-side search area and outer-side search areas.

The implementation of this processing enables the edge detection section 184 to omit edge detection in areas where the probability of the existence of the projection-target area 18 is low, making it possible to speed up the processing.

The projection-target area information generation section 186 determines the projection-target area 18 provisionally by setting a linear approximated straight line or linear approximated curve, such as that shown by the broken line in FIG. 20, based on the plurality of edge detection points detected by the edge detection section 184 (step S14).

The detection point evaluation section 188 also evaluates each edge detection point by determining whether or not each of the plurality of edge detection points detected by the edge detection section 184 is separated by at least a predetermined value from the linear approximated straight line or linear approximated curve set by the projection-target area information generation section 186 (step S15).

It could happen that illumination light 19 is comprised within the sensed image, as shown in FIG. 21, so that part of the illumination light is detected during the edge detection. If that should happen, the edge detection point T shown in FIG. 21 would be excluded from the processing performed by the projection-target area information generation section 186 because it would be separated by at least the predetermined value from the boundary line of the projection-target area 18.

In this manner, the projection-target area information generation section 186 detects the projection-target area 18 at a higher precision, by using only the edge detection points that are not excluded from the processing.

More specifically, the edge detection section 184 performs the edge detection on pixels peripheral to the edge detection points that have not been excluded from the processing, based on the third sensing information that is high-resolution sensing information (step S16). The edge detection section 184 outputs the edge detection information to the projection-target area information generation section 186.

The projection-target area information generation section 186 determines the projection-target area 18 by setting the linear approximated straight line or linear approximated curve again, based on that edge detection information (step S17). The projection-target area information generation section 186 generates projection-target area information indicating the positions of the four corners of the projection-target area 18.

As described above, this embodiment enables the projector 20 to generate positional information of the projection-target area 18 in a shorter time and also more accurately, by detecting the projection-target area 18 based on the high-resolution sensing information in the vicinity of boundary lines of the projection-target area 18 that have been detected provisionally based on the low-resolution sensing information. This enables the projector 20 to reduce the amount of calculations performed by the entire image processing system and thus execute image processing rapidly at a low load.

This embodiment also enables the projector 20 to generate positional information of the projection-target area 18 within a shorter time, by performing edge detection in a state in which the region subjected to the edge detection processing has been reduced.

The projector 20 can reduce the effects of noise and generate the positional information of the projection-target area 18 accurately, by excluding edge detection points that are separated from linear approximated straight lines or the like, from the processing. The projector 20 can also avoid erroneous detection of edges that could occur in the projection image 12 and thus perform more precise edge detection, by using a calibration image during the edge detection that does not comprise high-frequency components, such as an all-white image.

This enables the projector 20 to correct distortion of the projection image 12 or adjust the position thereof, and also perform suitable detection of a position that is indicated by using a laser pointer or the like within the projection image 12.

In this embodiment, the image distortion correction amount calculation section 162 determines the positional relationship between the screen 10 and the projection image 12, based on projection area information from the projection area information generation section 158 and projection-target area information from the projection-target area information generation section 186, and not only corrects distortion of the projection image 12 but also calculates image distortion correction amounts that ensure that the projection image 12 has a desired aspect ratio (the ratio of vertical to horizontal).

The image distortion correction section 112 corrects the image signals (R1, G1, and B1), based on those image distortion correction amounts. This ensures that the projector 20 can project an image without distortion, in a form in which the desired aspect ratio is maintained.

The method used for correcting image distortion is not limited to this method. For example, the projector 20 could detect the pixel that has the maximum luminance value within the sensed image, and base the correction of distortion of the image on the position of that pixel.

The projector 20 could also identify the four corners of the projection area to a higher precision than that obtained by using a pattern image that has a feature only at the center, by using an image that has features at the periphery thereof in addition to the center, such as the pattern image shown in FIG. 6B.

For example, during the identification of the points P1 and P2 in FIG. 7, the projector 20 could also identify points at which the luminance value in the vicinity thereof changes. However, when an approximated straight line is set by using a plurality of points at such a narrow spacing, an error of one pixel in a point that is the origin of the approximated straight line can have a greater effect than in an approximated straight line formed by using a plurality of points at a wider spacing.

Since this embodiment enables the projector 20 to set approximated straight lines by using a plurality of points at a wider spacing, by using the reference points of the center block area 16 and the reference points of the peripheral block areas 17-1 to 17-4, it is possible to identify the four corners of the projection area to a higher precision.

This enables the projector 20 to determine the position of the entire projection area very precisely, avoiding the effects of shading of the projector 20 or the sensor 60.

In addition, this embodiment enables the projector 20 to detect the position of the projection area more simply and also rapidly, by searching only the necessary areas of the difference image, not the entire difference image.

The first sensing information can be generated at an exposure suited to the usage environment by sensing the all-white image at a temporary automatic exposure setting and generating the first sensing information therefrom, during the projection of the calibration images. The projector 20 can also generate the second sensing information at an exposure suited to the generation of the difference image, by generating the second sensing information at the exposure used during the sensing of the all-white image.

In particular, by sensing an all-white image at the automatic exposure setting, the sensor 60 can utilize the dynamic range of the sensor 60 more effectively than in a method of sensing images at a fixed exposure, even when the screen 10 is affected by external light, when the reflection of the projected light is too weak because the projection distance is too great or the reflectivity of the screen 10 is too low, or when reflection of the projected light is too strong because the projection distance is too close or the reflectivity of the screen 10 is too high.

Modification of Second Embodiment

The description above concerned preferred embodiment of the present invention, but the application of the present invention is not limited to the embodiment described above.

For example, when the first sensing information and the third sensing information are generated, the first sensing information and the third sensing information could be generated the first time by the sensor 60 sensing the first calibration image 13 at the high resolution then subjecting the high-resolution sensing information to image processing to convert it into low-resolution sensing information.

An angle of view adjustment function (zoom function) of the projector 20 could be used for adjustments of the position or size of the projection image 12. This would enable reliable detection of the projection-target area under darkroom conditions.

In addition, the searching can be done in any sequence, so that the projector 20 could first search in the lateral direction with respect to the difference image to detect a center reference position or a peripheral reference position, then base a search in the vertical direction on that center reference position or that peripheral reference position.

Similarly, the projector 20 could perform various different processings by using the positional information for the projection area, such as correcting color variations within the projection area or detecting an indicated position within the projection area, based on the projection area information, other than the correction of image distortion based on the projection area information.

The projector 20 could also detect the projection area after detecting the projection-target area 18. For example, a projection-target area boundary point detection section could be provided to detect a plurality of boundary points of the projection-target area 18, based on the first sensing information and the center reference position. In addition, the peripheral reference position detection section 156 could be configured to detect peripheral reference positions that are positions closer to those boundary points than the center reference position, based on those boundary points.

Figure 22:
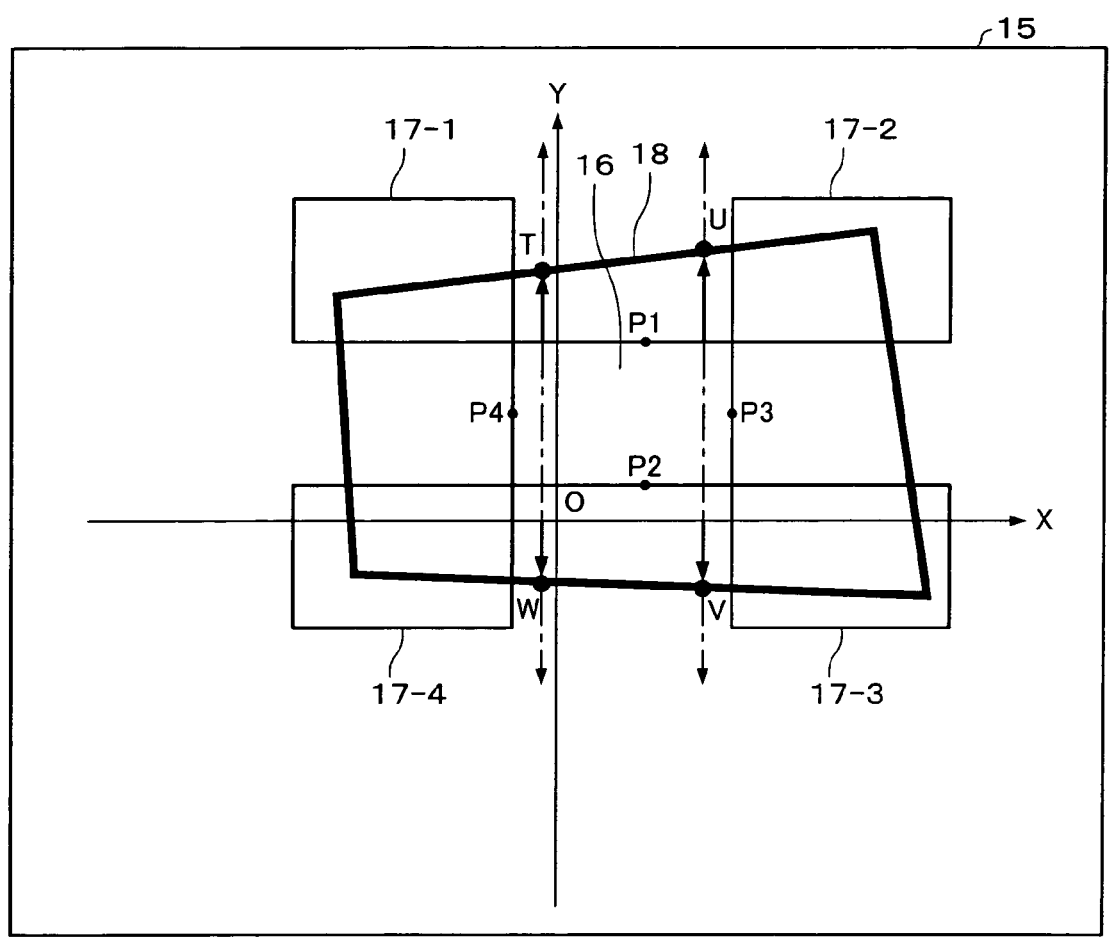
FIG. 22 is a conceptual view of a search method in a first stage of detection of peripheral reference positions in accordance with a modification of the second embodiment.
Figure 23:
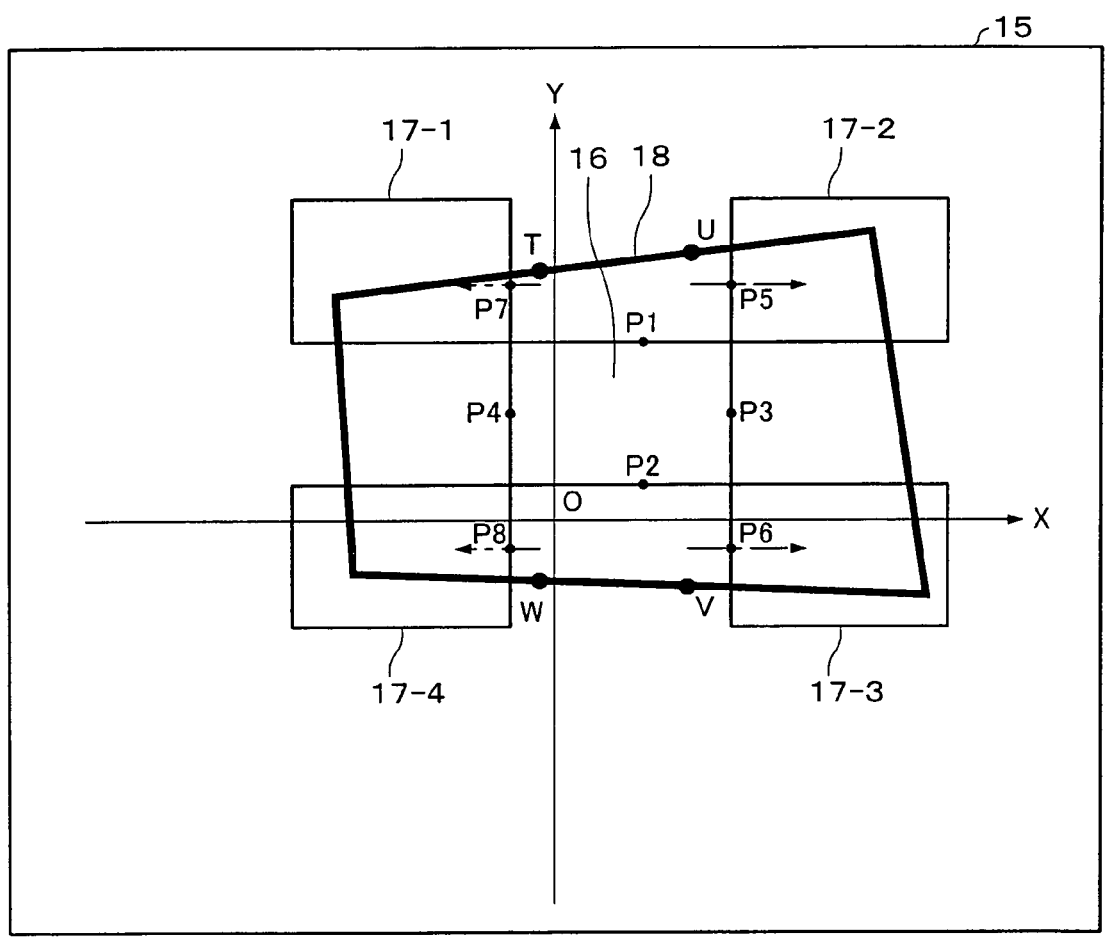
FIG. 23 is a conceptual view of a search method in a second stage of the detection of the peripheral reference positions in accordance with the modification of the second embodiment.

A conceptual view of a search method in a first stage in the detection of peripheral reference positions in accordance with a modification of the second embodiment is shown in FIG. 22. A conceptual view of a search method in a second stage in the detection of the peripheral reference positions in accordance with this modification of the second embodiment is shown in FIG. 23.

For example, the projection-target area boundary point detection section could perform the edge detection one pixel at a time outward from the points y1 and y2, which are the Y-coordinates of P1 and P2, on search support lines that are a few percent inward from each of P3 and P4, based on the center reference positions P1 to P4 of the center block area 16, as shown in FIG. 22. Thus the four edge detection points TUVW are detected.

The peripheral reference position detection section 156 detects the position Y=yQ that acts as reference for the search in the lateral direction on the upper side, based on whichever is the smaller value of yT that is the Y-coordinate of the point T and yU that is the Y-coordinate of the point U, together with y1 that is the Y-coordinate of the point P1. The edge detection section 184 detects the position Y=yR that acts as reference for the search in the lateral direction on the lower side, based on whichever is the smaller value of yV that is the Y-coordinate of the point V and yW that is the Y-coordinate of the point W, together with y2 that is the Y-coordinate of the point P2.

The peripheral reference position detection section 156 identifies the four points P5 to P8 by searching outward on the lines Y=yQ and Y=yR in the difference image from each of the intersections between the four straight lines X=xt, X=xU, Y=yQ, and Y=yR, and detecting pixels that are output. The peripheral reference position detection section 156 identifies the remaining four points P9 to P12 by a similar method.

The projector 20 can identify the center reference positions of the center block area 16 and the peripheral reference positions of the peripheral block areas 17-1 to 17-4 by such a method, to identify the positions of the four corners of the projection area.

In particular, such a method enables the projection area information generation section 158 to obtain an approximated straight line in a state in which the three points for deriving that approximated straight line are further apart. This enables the projector 20 to detect the position of the projection area to a higher precision.

Note that the numbers of the center reference positions and the peripheral reference positions can be set as required and are not limited as in the above-described embodiments.

The patterns of the first calibration image 13 and the second calibration image 14 are also not limited to those shown in FIGS. 6A and 6B, but it is preferable that the center block area 16 is formed in at least the state in which the difference image is formed, and in particular the center block area 16 and the peripheral block areas 17-1 to 17-4 are formed in the state in which the difference image is formed. For example, the configuration could be such that the first calibration image 13 comprises the center block area 16 and the second calibration image 14 comprises the peripheral block areas 17-1 to 17-4.

In addition, the shapes of the calibration images, the center block area 16, and the peripheral block areas 17-1 to 17-4 are not limited to being rectangular; they could equally well be any shape other than rectangular, such as circular. Of course the overall shapes of the calibration images and the shape of the center block area 16 are not limited to being similar; the shapes thereof could be such as to exhibit a correspondence therebetween. In addition, the number of peripheral block areas 17-1 to 17-4 is arbitrary.

The present invention is also effective in cases in which an image is projected onto a projection target such as a blackboard or whiteboard, other than the screen 10.

The embodiments described above related to examples in which an image processing system is mounted in the projector 20, but the image processing system could equally well be mounted in an image display device other than the projector 20, such as a cathode ray tube (CRT). A projector such as a digital micromirror device (DMD) could also be used as the projector 20, other than a liquid-crystal projector. Note that DMD is a trademark registered to Texas Instruments Inc. of the USA.

The functions of the above-described projector 20 could be implemented by the projector alone, by way of example, or they could be implemented by distributing them between a plurality of processing devices (such as between the projector and a PC).

In the above-described embodiments, the configuration was such that the sensor 60 was mounted within the projector 20, but the configuration could also be such that the sensor 60 and the projector 20 are separate independent devices.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. An image processing system comprising:
   image projection means for projecting a first calibration image and a second calibration image at different timings;
   sensing means for sensing the projected first and second calibration images and generating first and second sensing information; and
   projection area detection means for generating projection area information relating to a position of a projection area in a sensing area of the sensing means, based on the first and second sensing information,
   wherein a difference image between the first calibration image and the second calibration image is configured of a center block area positioned around the center of the difference image, a peripheral block area positioned on a periphery of the center block area, and a background area which is an area other than the center block area and the peripheral block area,
   wherein each pixel in the center block area and the peripheral block area has a different index value from each pixel in the background area, and
   wherein the projection area detection means comprises:
   difference image generation means for generating the difference image, based on the first and second sensing information;
   center reference position detection means for detecting a plurality of center reference positions of the center block area in the sensing area, based on the difference image;
   peripheral reference position detection means for detecting a plurality of peripheral reference positions of the peripheral block area in the sensing area, based on the center reference positions; and
   projection area information generation means for generating the projection area information, based on the center reference positions and the peripheral reference positions.

2. The image processing system as defined in claim 1, wherein the projection area information generation means generates the projection area information by setting a plurality of approximated straight lines or approximated curves based on the center reference positions and the peripheral reference positions and determining the shape or arrangement of the center block area and the peripheral block area.

3. The image processing system as defined in claim 2, wherein the projection area and the center block area are rectangular areas, and
   wherein the projection area information generation means determines positions of four corners of the center block area by deriving intersections of the plurality of approximated straight lines or intersections of the plurality of approximated curves, and generates the projection area information indicating positions of four corners of the projection area, based on the positions of the four corners of the center block area.

4. The image processing system as defined in claim 1, further comprising:
   projection-target area boundary point detection means for detecting a plurality of boundary points of projection-target area corresponding to a projection target in the sensing area, based on the first sensing information and the center reference positions;
   wherein the peripheral reference position detection means detects the peripheral reference positions, based on the boundary points.

5. An image processing system comprising:
   an image projection section which projects a first calibration image and a second calibration image at different timings;
   a sensing section which senses the projected first and second calibration images and generates first and second sensing information; and
   a projection area detection section which generates projection area information relating to a position of a projection area in a sensing area of the sensing section, based on the first and second sensing information,
   wherein a difference image between the first calibration image and the second calibration image is configured of a center block area positioned around the center of the difference image, a peripheral block area positioned on a periphery of the center block area, and a background area which is an area other than the center block area and the peripheral block area,
   wherein each pixel in the center block area and the peripheral block area has a different index value from each pixel in the background area, and
   wherein the projection area detection section comprises:
   a difference image generation section which generates the difference image, based on the first and second sensing information;
   a center reference position detection section which detects a plurality of center reference positions of the center block area in the sensing area of the sensing section, based on the difference image;
   a peripheral reference position detection section which detects a plurality of peripheral reference positions of the peripheral block area in the sensing area, based on the center reference positions; and
   a projection area information generation section which generates the projection area information, based on the center reference positions and the peripheral reference positions.

6. A projector having the image processing system as defined in claim 1.

7. An information storage medium which stores a program for causing a computer to function as:
   image projection means for projecting a first calibration image and a second calibration image at different timings;
   sensing means for sensing the projected first and second calibration images and generating first and second sensing information; and
   projection area detection means for generating projection area information relating to a position of a projection area in a sensing area of the sensing means, based on the first and second sensing information.

wherein a difference image between the first calibration image and the second calibration image is configured of a center block area positioned around the center of the difference image, a peripheral block area positioned on a periphery of the center block area, and a background area which is an area other than the center block area and the peripheral block area, wherein each pixel in the center block area and the peripheral block area has a different index value from each pixel in the background area, and wherein the projection area detection means comprises:

difference image generation means for generating the difference image, based on the first and second sensing information;

center reference position detection means for detecting a plurality of center reference positions of the center block area in the sensing area, based on the difference image;

peripheral reference position detection means for detecting a plurality of peripheral reference positions of the peripheral block area in the sensing area, based on the center reference positions; and projection area information generation means for generating the projection area information, based on the center reference positions and the peripheral reference positions.

8. An image processing method for performing image processing based on a difference image which is a difference image between a first calibration image and a second calibration image, the difference image being configured of a center block area positioned around the center of the difference image, a peripheral block area positioned on a periphery of the center block area, and a background area which is an area other than the center block area and the peripheral block area, and each pixel in the center block area and the peripheral block area having a different index value from each pixel in the background area, the image processing method comprising:

projecting the first calibration image;

sensing the projected first calibration image by using a sensing section, to generate first sensing information;

projecting the second calibration image;

sensing the projected second calibration image by using the sensing section, to generate second sensing information;

generating the difference image, based on the first and second sensing information;

detecting a plurality of center reference positions of the center block area in a sensing area of the sensing section, based on the difference image;

detecting a plurality of peripheral reference positions of the peripheral block area in the, sensing area, based on the center reference positions; and generating projection area information relating to a position of a projection area in the sensing area, based on the center reference positions and the peripheral reference positions.

9. The image processing method as defined in claim 8, comprising:

generating the projection area information by setting a plurality of approximated straight lines or approximated curves based on the center reference positions and the peripheral reference positions and determining the shape or arrangement of the center block area and the peripheral block area.

10. The image processing method as defined in claim 9, wherein the projection area and the center block area are rectangular areas, the image processing method comprising:

determining positions of four corners of the center block area by deriving intersections of the plurality of approximated straight lines or intersections of the plurality of approximated curves, and generating the projection area information indicating positions of four corners of the projection area, based on the positions of the four corners of the center block area.

11. The image processing method as defined in claim 8, comprising:

detecting a plurality of boundary points of projection-target area corresponding to a projection target in the sensing area, based on the first sensing information and the center reference positions; and detecting the peripheral reference positions based on the boundary points.

* * * * *